US012675890B2

(12) United States Patent
Zikos et al.

(10) Patent No.: US 12,675,890 B2
(45) Date of Patent: Jul. 7, 2026

(54) REAL-TIME SYSTEM FOR GENERATING 4D SPATIO-TEMPORAL MODEL OF A REAL WORLD ENVIRONMENT

(71) Applicant: MOVE AI LTD, London (GB)

(72) Inventors: Nikolaos Zikos, London (GB); Tino Millar, London (GB)

(73) Assignee: MOVE AI LTD, London (GB)

( * ) Notice: Subject to any disclaimer, the term of this patent is extended or adjusted under 35 U.S.C. 154(b) by 450 days.

(21) Appl. No.: 17/777,605

(22) PCT Filed: Nov. 18, 2020

(86) PCT No.: PCT/GB2020/052939
§ 371 (c)(1),
(2) Date: May 17, 2022

(87) PCT Pub. No.: WO2021/099778
PCT Pub. Date: May 27, 2021

(65) Prior Publication Data
US 2023/0008567 A1      Jan. 12, 2023

(30) Foreign Application Priority Data

Nov. 19, 2019   (GB) ..................................... 1916845
Mar. 13, 2020   (GB) ..................................... 2003704

(51) Int. Cl.
*G06T 7/292*       (2017.01)
*G06V 10/34*       (2022.01)
(Continued)

(52) U.S. Cl.
CPC .............. *G06T 7/292* (2017.01); *G06V 10/34* (2022.01); *G06V 10/46* (2022.01); *G06V 10/764* (2022.01);
(Continued)

(58) Field of Classification Search
CPC ..................... G06T 7/292; G06T 17/00; G06T 2207/10021; G06T 2207/20016;
(Continued)

(56) References Cited

U.S. PATENT DOCUMENTS

| | | |
|---|---|---|
| 2012/0051588 A1 | 3/2012 | McEldowney |
| 2019/0139297 A1* | 5/2019 | Chen ....................... G06T 19/20 |

(Continued)

FOREIGN PATENT DOCUMENTS

| | | |
|---|---|---|
| CN | 109003301 A | 12/2018 |
| CN | 110070573 A | 7/2019 |

(Continued)

OTHER PUBLICATIONS

García-Vallejo, D. and Schiehlen, W., 2012. 3D-simulation of human walking by parameter optimization. Archive of Applied Mechanics, 82, pp. 533-556.*

(Continued)

*Primary Examiner* — Zhitong Chen
(74) *Attorney, Agent, or Firm* — TOPE-MCKAY & ASSOCIATES

(57) ABSTRACT

The present invention relates to a method for deriving a 3D data from image data comprising: receiving, from at least one camera, image data representing an environment; detecting, from the image data, at least one object within the environment; classifying the at least one detected object, wherein the method comprises, for each classified object of the classified at least one objects: determining a 2D skeleton of the classified object by implementing a neural network to identify features of the classified object in the image data corresponding to the classified object; and constructing a 3D skeleton for the classified object, comprising mapping the determined 2D skeleton to 3D.

25 Claims, 7 Drawing Sheets

(51) Int. Cl.

| | |
|---|---|
| *G06V 10/46* | (2022.01) |
| *G06V 10/764* | (2022.01) |
| *G06V 10/82* | (2022.01) |
| *G06V 20/40* | (2022.01) |
| *G06V 20/64* | (2022.01) |
| *G06V 40/10* | (2022.01) |
| *G06V 40/20* | (2022.01) |

(52) U.S. Cl.
CPC .............. *G06V 10/82* (2022.01); *G06V 20/42* (2022.01); *G06V 20/647* (2022.01); *G06V 40/103* (2022.01); *G06V 40/23* (2022.01)

(58) Field of Classification Search
CPC . G06T 2207/20076; G06T 2207/20081; G06T 2207/20084; G06T 2207/20221; G06T 2207/30196; G06T 2207/30228; G06T 2207/30244; G06T 7/75; G06T 7/251; G06T 7/277; G06T 7/73; G06T 2200/08; G06T 2207/30221; G06T 2207/30224; G06T 2207/20021; G06V 10/34; G06V 10/46; G06V 10/764; G06V 10/82; G06V 20/42; G06V 20/647; G06V 40/103; G06V 40/23; G06V 40/10; A63B 24/0021; A63B 2024/0025; A63B 2024/0028
See application file for complete search history.

(56) References Cited

U.S. PATENT DOCUMENTS

| | | | |
|---|---|---|---|
| 2019/0266780 A1* | 8/2019 | Le Floch | ................ G06T 15/04 |
| 2019/0287310 A1 | 9/2019 | Kopeinigg et al. | |

FOREIGN PATENT DOCUMENTS

| | | | |
|---|---|---|---|
| GB | 2575843 A | 1/2020 | |
| GB | 2578783 A | 5/2020 | |
| GB | 2593335 A | 5/2020 | |
| JP | 2019032660 A | 2/2019 | |
| JP | 2019079487 A | 5/2019 | |
| JP | 6534499 B1 | 6/2019 | |
| KR | 20130140772 A | 12/2013 | |
| WO | WO 2006/111928 A2 | 10/2006 | |
| WO | 2012095756 A2 | 7/2012 | |
| WO | 2018061616 A1 | 4/2018 | |
| WO | WO-2019075133 A1 * | 4/2019 | ............... G01S 3/00 |

OTHER PUBLICATIONS

Bridgeman, L., Volino, M., Guillemaut, J.Y. and Hilton, A., 2019. Multi-person 3d pose estimation and tracking in sports. In Proceedings of the IEEE/CVF conference on computer vision and pattern recognition workshops.*

Lin, M., Lin, L., Liang, X., Wang, K. and Cheng, H., 2017. Recurrent 3d pose sequence machines. In Proceedings of the IEEE conference on computer vision and pattern recognition (pp. 810-819).*

L. Zhao et al., "Semantic Graph Convolutional Networks for 3D Human Pose Regression", 2019 IEEE/CVF Conference on Computer Vision and Pattern Recognition (CVPR), downloaded May 29, 2024 from IEEE Xplore, 11 pages.

M. Tian et al., "Eliminating Background-bias for Robust Person Re-identification", 2018 IEEE/CVF Conference on Computer Vision and Pattern Recognition, downloaded May 30, 2024 from IEEE Xplore, 10 pages.

J. Wang et al., "A Markerless Body Otion Capture System for Character Animation Based on Multi-View Cameras", downloaded May 30, 2024 from IEEE Xplore, 5 pages.

Examination Report under Section 18(3), App. No. GB1916845.9, Mailed Dec. 3, 2021, 4 Pages.

Examination Report under Section 18(3), App. No. GB1916845.9, Mailed Oct. 1, 2021, 4 Pages.

Examination Report under Section 18(3), App. No. GB1916845.9, Mailed Jul. 13, 2021, 3 Pages.

Combined Search and Examination Report under Sections 17 and 18(3), App. No. GB1916845.9, Mailed Apr. 2, 2020, 7 Pages.

Combined Search and Examination Report under Sections 17 and 18(3), App. No. GB2003704.0, Mailed Sep. 14, 2020, 3 Pages.

Notification of Transmittal of the International Search Report and the Written Opinion of the International Searching Authority, or the Declaration, App. No. PCT/GB2020/052939, Mailed Feb. 8, 2021, 16 Pages.

Wren, et al, "Dynamic Models of Human Motion," IEEE 0-8186-8344-9/98, 1998, 6 Pages.

Wren C R et al: "Dynamic models of human motion", Proceedings Third IEEE International Conference on Automatic Face and Gesture Recognition, 1998. Nara, Japan Apr. 14-16, 1998, Los Alamitos, CA, USA, IEEE Comput. Soc, US, Apr. 14, 1998, pp. 22-27, XP10277608, DOI: 10.1109/AFGR.1998.670920, ISBN: 978-0-8186-8344-2.

EP Application No. 20815901.2: Examination Report dated Nov. 29, 2024, 10 pages.

* cited by examiner

*100*

Input image data ⟋102

Derivation of 3D semantic information ⟋104

Integration of derived semantics with 3D model ⟋106

Output ⟋108

REAL-TIME SYSTEM FOR GENERATING 4D SPATIO-TEMPORAL MODEL OF A REAL WORLD ENVIRONMENT

FIELD OF THE INVENTION

The present invention relates to a real-time system that is configured to derive 4D spatio-temporal data describing a real world environment, and generate an accurate 4D spatio-temporal model from said data. In particular, the system is configured to process image data to detect, classify and identify objects within a real world environment, derive three dimensional descriptor information accurately describing those objects and, using that descriptor information generate a 4D model accurately depicting the environment. In this manner, the system is configured to model objects by extracting the semantics of the objects, represented by descriptor data, and using that description of the semantics to reconstruct the model.

BACKGROUND OF THE INVENTION

Three dimensional digital representations of environments are employed in a wide variety of fields. One use is the visualisation of virtual environment—such as in video gaming to create an immersive experience for a player, or in design work to assist a designer in his or her understanding of that environment before construction. Another—and particularly advantageous—use is the use of 3D models for the visualisation and representation of existing, real-world environments.

Observing a real-world environment through direct observation (in person or by means of video recording) presents a limited perspective on said environment. An observer is restricted to his/her own perspective, or the perspective of the camera chosen for observation. If one wishes to observe the same real-world environment from a different perspective (e.g. location/angle/field of view), then the observing person needs to physically relocate, or set up an alternative camera to provide an alternative/additional feed. However, there are shortfalls to such relocations—for example, setting up multiple cameras and the associated hardware and structured cabling is time consuming and costly, there is an upper limit on the number of cameras that can realistically exist in an environment, there are some points in the environment where the camera cannot be placed (e.g. in the middle of a football pitch during a game), and setting up a new camera would not assist in providing a new observing perspective on events that have already happened. Furthermore, direct observation is limited in the information that one can realistically derive about the environment.

For example, sports matches (such as football, tennis or rugby) are intensively analysed by observers (human and cameras) for compliance to the rules of the sport. While the rules of games vary from sports to sports, a common component is that compliance of violation of the rules depend on the determination of the location of a user, or piece of sports equipment, within the environment of the sport. One example is the offside rule in football, where a player is in an 'offside' position if any of his or her body parts, except the hands and arms, are in the opponents' half of the pitch, and closer to the opponents' goal line than both the ball and the second-last opponent player. The exact definition of the offside rule may develop or change over time, but compliance is always determined by considering the relative placement of objects (including players) on the pitch. Thus, accurately observing the location of multiple players—and the body parts of those players—in relation to the pitch is crucial.

Referees and other individuals are employed to perform such observation, but they are not capable of observing all aspects of play at once. Existing technologies have been developed to improve the observation of a sporting environment and its components, but these have also attracted criticism for the accuracy of those observations. For example, in football, a "Video Assistant Referee" (or VAR) is often employed—the VAR is a further observer who views video footage collected from multiple angles to determine if rules have been complied with (e.g. view players from a different angle to check compliance with the offside rule). However, determining pitch conditions even from additional perspectives can be challenging and accuracy can be restricted if one is unable to accurately place individual components.

A solution to the limitations of direct observation is instead to construct a 3D representation of the environment in question, which can then be manipulated and observed to determine physical environment properties. It is therefore desirable to implement techniques to construct a highly accurate 3D version of a real-world environment, which can then be manipulated to observe the pitch from multiple angles not present in the original data. The derived 3D model can also be analysed and manipulated to infer additional information not available from traditional observation. Thus, previously unseen (yet still accurate) perspectives can be viewed, and data inferences made, without the need to employ separate observers or additional cameras.

One method for 3D modelling known in the art is to implement motion capture systems, in which multiple trackers can be placed upon a subject to be observed, allowing an imagining system to track specific surface points on the subject in 3 dimensions to implement 3D tracking. However, such systems are limited to monitoring subjects that have been specifically prepared with the necessary trackers for the purpose. This may also be impractical to the environment to be modelled (e.g. a sports game). It is therefore preferable to be able to perform 3D modelling on data that is already available (e.g. camera/video data of the environment).

Existing techniques that enable derivation of 3D information from camera/video data include the collection of image data from multiple perspectives, and rendering a 3D version of that environment by calculating positions of objects in the environment pixel-by-pixel. However, image data includes millions of pixels, and a comparison of positions pixel-by-pixel requires finding the correspondence between trillions of combinations; this not only represents a significant computational challenge, but requires the processing of large amounts of data in order to provide any degree of accuracy to any derived 3D model. Thus, the use of such techniques for generation of a model that is sufficiently accurate is not practical or feasible for performance in real-time, and an accurate 3D representation of the environment can only be realistically be rendered after the conclusion of any event (e.g. sports match) that the system seeks to model.

Furthermore, real-world environments are not static quantities—many objects within the environment will move with respect to the environment and may themselves be deformable objects (e.g. human movement of limbs or bending of non-rigid objects). Existing techniques of 3D data extraction may operate by extracting 3D information from individual frames of image data in isolation, and then merged together to form a time-dependent sequence (i.e. 4D image data).

This can result in anomalies between frames (e.g. "stutter" of motion), which represent inaccuracies in the final 4D image data. Furthermore, a deformable object across multiple frames may be recognized differently, producing an inconsistent and inaccurate evolution of fitted 4D data.

It is therefore desirable to provide a method for processing image data to derive 4D spatio-temporal information to describe a 3D environment that accurately describes the 3D environment in space and time. The present invention seeks to provide such a system to address the aforementioned disadvantages of the prior art to derive accurate real-time 4D descriptor data, and use that data to generate an 4D spatio-temporal model that accurately represents the environment.

SUMMARY OF THE INVENTION

According to a first aspect of the present invention, there is provided a method for deriving a 3D data from image data, comprising: receiving, from at least one camera, image data representing an environment; detecting, from the image data, at least one object within the environment; classifying the at least one detected object, wherein the method comprises, for each classified object of the classified at least one objects: determining a 2D skeleton of the classified object by implementing a neural network to identify features of the classified object in the image data corresponding to the classified object; constructing a 3D skeleton for the classified object, comprising mapping the determined 2D skeleton to 3D. The method thus provides a means for generation of 3D data descriptor data through an intermediary step of generating 2D data. Calculating 2D descriptor data in the form of 2D skeletons and 3D descriptor data in the form of 3D skeletons reduces the number elements describing the object to the modelled from the millions of pixels describing the object in the image data by multiple orders of magnitude. As such, the method is significantly more computationally efficient and quicker and possible to be performed in real-time.

Advantageously, each of said at least one object comprises a plurality of associated sub-objects, and wherein, for each of said at least one object: detecting at least one object comprises detecting each of the plurality of associated sub-objects; classifying at least one object comprises classifying each of the plurality of associated sub-objects; determining the 2D skeleton of the classified object comprises identifying features of each of the plurality of classified sub-objects in the image data corresponding to the classified sub-objects. Thus, the object for which 2D descriptor information can be derived is segmented, and the 2D skeleton constructed from identifying the position of the sub-objects with respect to each other. This simplifies the task of deriving the semantic information for each sub-object, and in particular reduces the complexity of a neural network for performing determination of 2D descriptor information.

Advantageously, for each classified object, mapping the determined 2D skeleton to 3D comprises: implementation of a neural network; and/or applying statistical and/or probabilistic methods to the determined 2D skeleton and applying holonomic constraints to the statistical and/or probabilistic methods. A 3D skeleton describing an object can be constructed of many individual points, with a correspondingly large parameter space. By applying holonomic constrains to the degrees of freedom available in fitting such multiple points can significantly reduce the parameter space without sacrificing any accuracy of the final model. Thus, the processing speed of the estimation process can be significantly reduced.

Further advantageously, classifying the at least one detected object comprises classifying a first detected object of the at least one detected object as a human object, and, when statistical and/or probabilistic methods are applied to the determined 2D skeleton, the holonomic constraints comprise human anatomical holonomic constraints. Human objects are understood to be deformable, in that the shape and configuration can vary independent of the environment in which they are placed. Such high degrees of freedom represents a challenging computational problem, solved by the appropriate application of a trained neural network and/or a reduction in the dimensionality of the problem through application of specific holonomic constraints.

Advantageously, 3D skeleton comprises an anchor point and a plurality of child points, each child point is defined by applying a transformation to the anchor point or another child point of the plurality of child points, wherein the holonomic constraints define the degrees of freedom of the transformation defining each child point, and/or the range of possible values for each degree of freedom of the transformation. Defining each point with respect to previous points allow for segmentation of the skeleton into sub-groups or networks that can be independently fitted and to which specific holonomic constraints can be applied. This can reduce the dimensionality of the problem, thus making processing quicker and less processor-intensive.

Advantageously, classifying the at least one detected object comprises classifying a second detected object of the at least one detected object as a non-human object. The present invention demonstrates significant flexibility in being able to accurately model a wide variety of objects.

Advantageously, the at least one camera comprises a plurality of cameras; wherein detecting at least one object comprises detecting said at least one object in image data collected from each camera; classifying the at least one object comprises classifying said at least one object detected in the image data from each camera; determining the 2D skeleton for each classified object comprises determining a plurality of 2D skeletons, each of said plurality of 2D skeletons determined from identifying features of the classified object in image data collected from a different camera of the plurality of cameras; and wherein constructing the 3D skeleton comprises combining the determined plurality of determined 2D skeletons. Providing simultaneous feeds of the same object from different cameras improves the accuracy of the final constructed 3D skeleton. In addition, the intermediary step of calculating 2D descriptor data in the form of 2D skeletons and 3D descriptor data in the form of 3D skeletons reduces the number elements describing the object to the modelled from the millions of pixels describing the object in the image data. Thus, complexity of finding correspondence between images of different cameras is significantly reduced, as compared to performing a pixel-by-pixel comparison of millions of pixels (which would require trillions of comparisons to be performed).

Advantageously, the image data comprises a time-ordered sequence of frames, the time-ordered sequence of frames comprising frames collected from each camera of the at least one cameras and said detecting at least one object within the environment comprises detecting said at least one object in each frame of the time-ordered sequence of frames, said classifying the at least one detected objects comprises classifying the at least one detected object in each frame of the sequence of frames; and each classified object of the classified at least one objects is tracked across the time-ordered sequence of frames. By including consideration of time-dependent input data, the method is thus able to provide spatio-temporal output models.

Further advantageously, each classified object is tracked across the time-ordered sequence of frames by implementing a recursive estimator; and, for each classified object, mapping the determined 2D skeleton to 3D comprises: determining a plurality of 3D skeletons to form a time-varying 3D skeleton, and applying a recursive estimator across the time-ordered sequence of frames to determine a time-varying 3D skeleton for the classified object. The method is thus able to refine the accuracy of determined 3D descriptor information based on historical determinations.

Further advantageously, the application of recursive estimators comprises applying time-dependent holonomic constraints. As mentioned above, the 3D skeleton for any one object can include a large number of 3D points and a correspondingly large parameter space. This parameter space increases further as the object moves in time as a time-dependence of each 3D point of the 3D object is to be determined to determine the time-evolution of the 3D skeleton. By applying time-dependent holonomic constrains, the parameter space is reduced without sacrificing accuracy of the derived 3D information. As such, the processing speed of the estimation process can be significantly reduced. Optionally, the 3D skeleton comprises an anchor point and a plurality of child points, each child point is defined by applying a transformation to the anchor point or another child point of the plurality of child points, and the time-varying 3D skeleton is defined by time-variable transformations for each child point, and the time-dependent holonomic constraints define, for each point in time, the degrees of freedom of transformation defining each child point and/or the range of possible values for each degree of freedom of the transformation. Defining each point with respect to previous points allow for segmentation of the skeleton into sub-groups or networks that can be independently fitted and to which specific time-dependent holonomic constraints can be applied. This can reduce the dimensionality of the problem, thus making processing quicker and less processor-intensive.

Further advantageously, the at least one camera comprises at least one first type of camera and at least one second type of camera, wherein each of the first type of camera captures image data at a first framerate, and each second type of camera captures image data at a second framerate that is different to the first framerate. Additional image data from additional cameras can improve the accuracy of the fitted 4D descriptor data, and also provide additional time points for measurement and determination of the 4D descriptor data, providing a smoother and more accurate determination of the 4D skeleton.

Advantageously, the method further comprises constructing, from the image data, a 3D model of the environment. The same data used to generate the 3D avatars is used to construct the 3D environment model, providing consistency across the outputs of the method. The use of an intermediate stage of an environment map removes the requirement to conduct time- and processor-intensive derivation of a 3D environment in real-time.

Further Advantageously, the 3D environment model is constructed by applying Simultaneous Localisation and Mapping techniques to the image data to estimate a position and an orientation of each camera of the at least one camera and to construct an environment map; and constructing the 3D model by mapping the environment map to a predetermined 3D model of the environment. SLAM techniques allow for the use of image data even when the position of those cameras is not known such as in the case where a camera is moving through the environment. Thus, the method may incorporate a wider variety of input image data sources.

Further advantageously, the method further comprises integrating the time-varying 3D skeleton with the 3D environment model to construct a time-varying integrated environment. As such, an accurate 3D representation of the environment may be output without fully rendering the 3D models. Thus, the environment can be described using minimal data. With the present method, the integrated model may be stored or sent to another computing device for later reconstruction of a fully rendered 3D environment model. This is advantageous since fully rendered 3D models are described with large amounts of data, but are not required for a fully accurate representation of the scene. Thus, the integrated model can be stored and transmitted with minimum data requirements, and the 3D pre-generated models mapped to the integrated environment only when needed to produce a final model.

Advantageously, the method further comprises, for each classified object of the classified at least one objects: constructing a 3D avatar for the classified object comprising integrating the constructed 3D skeleton with a 3D model corresponding to the classified object. The method thus provides a means for generation of a 3D model of an object from the generated 3D descriptor data, and mapping pre-rendered objects onto that descriptor data. As such, the generation of a 3D rendered model is significantly more computationally efficient and quicker and possible to be performed in real-time.

Advantageously, the method further comprises capturing the 3D model corresponding to the classified object at a higher resolution than the resolution of the image data. With traditional 3D image capture techniques, the resolution of the final generated 3D model is limited by the resolution of the image data being used to generate the model. With the present invention, low resolution image data can be used to generate accurate descriptor information, to which high resolution models can then be mapped. Thus, the present method is not limited in the resolution of the input image data of the environment to be modeled.

Advantageously, the method further comprises: for each classified object of the classified at least one objects: constructing a 3D avatar for the classified object comprising integrating the constructed 3D skeleton with a 3D model corresponding to the classified object, and integrating the determined 3D environment model with the constructed 3D avatar for each of the classified objects to construct a 3D model of an integrated environment, said integrated environment comprising said environment and said objects within the environment. The system thus provides a final output that integrates all determined outputs for a full and accurate reproduction of an observed environment.

Advantageously, the method further comprises refining the construction of the integrated environment by applying time-dependent smoothing to the constructed 3D avatar, using filtering methods. Further advantageously, the method further comprises refining the construction of the integrated environment by constraining interactions between each constructed 3D avatar and the 3D environment model. Yet further advantageously, constructing a 3D avatar for each of the classified objects comprises constructing a plurality of 3D avatars, and the method further comprises refining the construction of the integrated environment by constraining interactions between the plurality of 3D avatars. Such refinements of the output integrated environment reduce errors or mismatches that might result from integration, thereby providing a more accurate output model.

In another aspect of the present invention, there is provided a computer comprising a processor configured to carry out any method described above.

In yet another aspect of the present invention, there is provided a computer program comprising instructions that, when executed by a processor, cause the processor to carry out any method described above.

The present invention is able to provide, in real time, highly accurate spatio-temporal representations of a wide variety of environments and the objects within. Environments that can be modelled include, but are certainly not limited to, a football pitch (and the constituent players and elements), a race track (where the racetrack may be for human races or for animal races, and the constituent components can include humans and/or animals accordingly), olympic sporting events (such as cycling, javelin, archery, long jump, etc.), tennis matches, baseball games, etc.

BRIEF DESCRIPTION OF THE DRAWINGS

Embodiments of the present invention will now be described by way of example with reference to the accompanying drawings in which.

DETAILED DESCRIPTION OF A PREFERRED EMBODIMENT

The present invention seeks to address the above-identified shortcomings of the prior art through an improved means of generating an accurate 3D model of objects in an environment, and of the environment itself. The 3D model is an accurate representation in space and, advantageously, in time as the objects within the environment move. In particular, instead of seeking to reproduce a 3D environment pixel-by-pixel from the image data, the image data is instead processed to derive underlying descriptor data accurately describing the environment and objects within the environment. Pre-rendered objects can then be mapped to the descriptor data to reconstruct the 3D environment. The system thereby significant reduces the processing power to construct the 3D environment but without a loss of accuracy.

Figure 1:
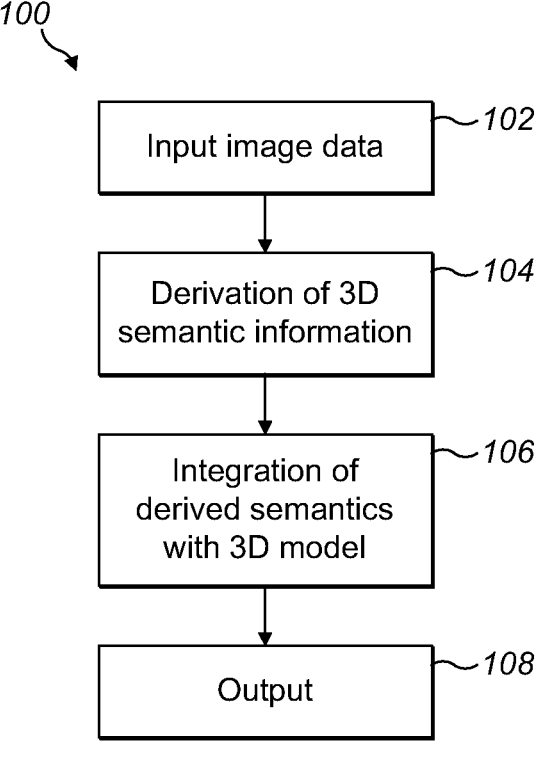
FIG. 1 is a flow chart illustrating the general architecture of methods in accordance with the present invention.

The general architecture 100 of the present invention is illustrated in FIG. 1, setting out the steps by which a three dimensional (3D) model or four dimensional (4D) spatio-temporal model can be derived from input image data.

Input image data is provided at 102. The input image data includes, but is not limited to, single images, multiple images, video, depth camera data and laser camera data. The input image data is processed at 104 to derive 3D descriptor data describing the environment and objects within the environment. The 3D descriptor data, in the context of the present invention, is understood as data describing underlying features of the environment that describe that environment, and underlying features of objects within the environment that describes those objects. In this sense, the 3D descriptor data is understood to describe the underlying "semantics" of the object and/or environment. For example, in the context of a football game, the placement of a human being on a pitch can be described by identifying the relative location of anatomical parts of the body (e.g. elbow, neck, heel, wrist) of the human body in respect to each other and with respect to the pitch, and the placement of a ball in the environment can be described by the location of the centre of mass of the ball in respect to the pitch. For example, the 3D descriptor data includes 3D co-ordinates of joints on the body, or 3D co-ordinates of sub-objects, such as a head, arm, etc. The derived 3D descriptor data can also be processed and analysed to perform measurement on elements of the modelled environment (for example, the speed of a ball or a player, average distances between players or other items in the environment). As will be described in more detail later, the 3D descriptor data derivation can be performed across multiple points in time to create time-evolving 3D descriptor data (i.e. 4D descriptor data).

After identification of the 3D descriptor data, the system then performs an integration step 106, where the 3D descriptor data for an object in the image data is mapped to a corresponding 3D model for that object, resulting in the 3D model accurately representing the orientation of the object as described by the descriptor data. For example, for a 3D model of a human, 3D co-ordinates of points in that model are matched to corresponding 3D co-ordinates derived from the image data. The resulting 3D model is then a representation of the human object as depicted in the image data. In the case of the modelled football, the centre of mass of a 3D model of a football can be mapped to the centre of mass derived from the image data such that the 3D football model is a representation of the football as depicted in the image data. The integration step 106 is independently carried out for multiple objects in the environment, which are then integrated together with a 3D model of the environment itself to provide an integrated environment at output 108.

The final integrated environment is provided as a 3D model in a format that can then be employed flexibly by a user of graphics rendering software. For example, the model can be used to generate a new image of the environment from a perspective not present in the original image data. The construction of a 3D model through intermediate derivation of descriptor data allows for an accurate modelling of an environment in real time. Further detail on processing step 104 and integration step 106 is provided below.

Figure 2:
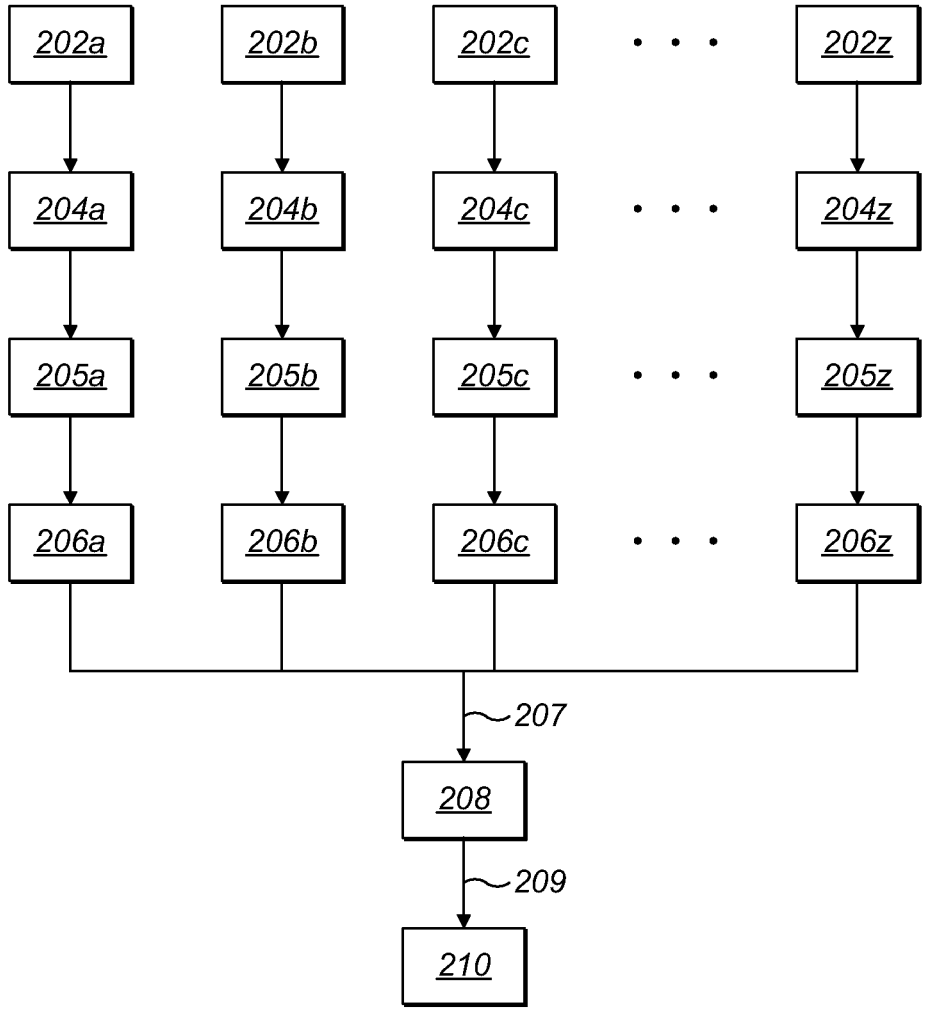
FIG. 2 is a flow chart illustrating an exemplary method for constructing a 3D avatar according to the present invention.

FIG. 2 illustrates an example image data processing methodology for use in the processing step 104. The methodology is a method 200 for deriving a 3D data from image data. The method 200 comprises receiving 203, from at least one camera 202*a*, image data 204*a* representing an environment. The camera 202*a* is any vision system suitable for collecting image data, including (but not limited to) a 2D camera, a 2D video camera, a 3D depth camera, a 3D depth video camera, a Light Detecting and Ranging (LIDAR). The camera 202*a* thereby produces appropriate image data 204*a* (e.g. 2D images, 2D video, 3D images, 3D video, LIDAR data). The method described below in respect of FIG. 2 is provided in connection with static images. 3D object modelling for video image data (i.e. image data comprising a time ordered sequence of frames) is discussed later, in connection with FIG. 5. The image data can be, for example, a live video feed from TV cameras arranged within the environment of a football stadium.

The image data 204*a* represents a view of the environment. The view will include, represented in the image data, multiple objects representing that environment. Those objects will include static objects (e.g. goalpoast, stalls) within the environment and dynamic objects (e.g. players, ball) within the environment.

The method 200 includes detecting, from the image data 204*a*, at least one object within the environment. Any suitable methodology can be used to detect an object within the environment from the image data 204*a*. For example, an autonomous object detection system can be used to detect objects in the images. The autonomous object detection system uses one or more neural networks in order to define the position and bounding box of objects. The input of the autonomous object detection system is raw image data, and the output is a position and a bounding box of an object. Any suitable neural network may be employed, including Multi-Layered Deep Neural Networks (such as convolutional neural networks).

The one or more neural networks are configured to recognise a wide variety of different objects through training of the neural network(s) using image repositories such as ImageNet and Coco, which include over 1.5 million stock images. For example, the stock images include many images of humans of different ages, size, gender, ethnicity, wearing different clothes, provided on a variety of many different backgrounds, and standing in different poses and positions. Similarly varied images of other items (e.g. sports equipment, seats) are provided for training of the neural network. By training the system on this repository of images, the system is able to recognise—to a required degree of confidence—which part of the image data is an object and which part of the image is not an object.

The objects detected in the environment can be of many different classes and types. The method 200 thus further comprises classifying the at least one detected object to identify a classified object 205*a*. Any suitable methodology can be used to classify the objects detected within the environment from the image data. For example, an autonomous object classifier can be used to classify objects. Confidence values may be calculated for every possible class from a pre-defined set of classes, and the object with the highest confidence value is selected as the class for the object. The autonomous object classification system may implement one or more neural networks. Any suitable neural network may be employed, including Multi-Layered Deep Neural Networks (such as convolutional neural networks).

In the neural network(s) of the autonomous object classification system, the input is an object to be classified (in the form of the image data contained within the bounding box of the detected object), and the output is the object class to which the detected object belongs. The neural network(s) is/are configured to classify a wide variety of different objects through suitable training of the neural network(s). For example, the neural network(s) is/are trained using input images that have been tagged with an appropriate class. The input images for training may again be sourced from visual databases (including open datasets such as ImageNet and Coco), in which the objects have been classified manually by human users prior to the training of the neural network(s).

Optionally, the method can include a step of object identification (not illustrated), in which a classified object may be identified as belonging to a sub-class, or being a specific instance of a class of object (for example, a specific player or a specific type of tennis racquet). For example, the system may incorporate OCR techniques to read any text that might be present in the image data corresponding to the classified object (for example, a contestant name in an Olympic event, or a player number in a football event). In addition to, or in combination, the method may implement neural networks to identify the objects. The neural networks for object identification may be trained and applied in substantially similar manner to those neural networks described above for object classification.

The above described method steps relate to the identification of objects within the environment data. The steps of the method 200 that follow are related to the derivation of semantic information for each object, in the form of derivation of 3D descriptor information, where each subsequent method step can be applied to one or more of the classified objects.

As is described above, the object classes that are classified and for which 3D descriptor data is derived can be of different classes and types. One such class of object is "non-deformable" objects. A non-deformable object is one that has a shape and pose is not variable (e.g. a cricket bat, or goalpoast, etc). Another such class of object is "deformable" objects. A deformable object is one that has a shape and pose that is variable (e.g. in the case of a human, the orientation of arms, legs and head can change). Modelling such objects provides further complications, since a deformable object to be identified will have a varying pose not only with respect to the camera that collects the image data, but also with respect to which pose the object is in at the point in time that the image is collected. A human is one example of a deformable object, but it would be readily understood that many other types of deformable objects exist, such as other living creatures (dog, horse, bird, etc), and a variety of inanimate objects (such as a bow for archery, a javelin, a pole for the highjump, etc.). Given above-described complexity, deriving the semantic/descriptor information for deformable objects is technically more challenging than deriving semantic/descriptor information for non-deformable objects, and deriving the semantic/descriptor information for some non-deformable objects is more challenging than other non-deformable objects.

For example, for a non-deformable fully 3D symmetric object (such as a rigid ball), the 3D semantic/descriptor information can be a single point in 3D space and for a non-deformable object with partial or no symmetry, the 3D semantic/descriptor information can include two or more points in 3D space. For example, a javelin or rigid pole can be described by two points in 3D space. The more complicated the non-deformable object, the more points in 3D space might be used to form the 3D semantic/descriptor information for that object. However, it is understood that for non-deformable, while the placement of the 3D points in the descriptor information may vary relative to the environment, the relative positioning of each point in 3D space does not change. For any deformable object, given that the overall surface shape and pose is variable, the 3D descriptor information may include multiple 3D points that have variable positions with respect to the environment, and with respect to each other.

Regardless of the object for which 3D semantic/descriptor information is to be derived, and the associated level of complexity, the same challenge is present—to derive specifically three dimensional descriptor data from input image data alone. This challenge is addressed by the steps described below.

In particular, for each classified object of the classified at least one objects, the method 200 further comprises determining 205 a 2D skeleton 206a of the classified object 205a by implementing a neural network to identify features of the classified object 205a in the image data 204a corresponding to the classified object 205a. In the context of the present invention, a 'skeleton' of an object is understood be a reduction of an object to a plurality of its representative elements, and a 2D skeleton is understood to mean those representative elements projected into a 2 dimensional plane, thus representing 2D semantic/descriptor data for the classified object. As described above, the number of 3D elements to fully describe each object can vary in number. Correspondingly, the number of 2D elements in a 2D skeleton may also vary as needed to fully describe the dimensions and pose of the classified object.

The process of deriving a 2D skeleton is set out below, with reference to examples illustrated in FIGS. 3A-3C and FIGS. 4A-4C.

Figure 3C:
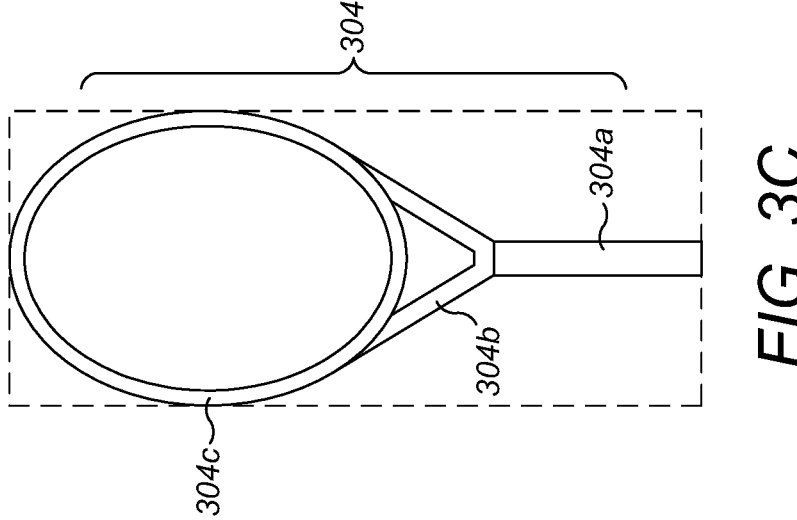
FIG. 3C is an illustration of another example 2D skeleton for the object of FIG. 3A.
Figure 3B:
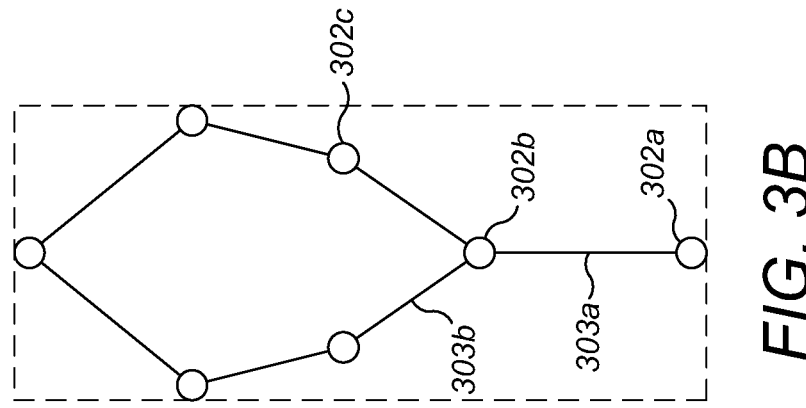
FIG. 3B is an illustration of an example 2D skeleton for the object of FIG. 3A.
Figure 3A:
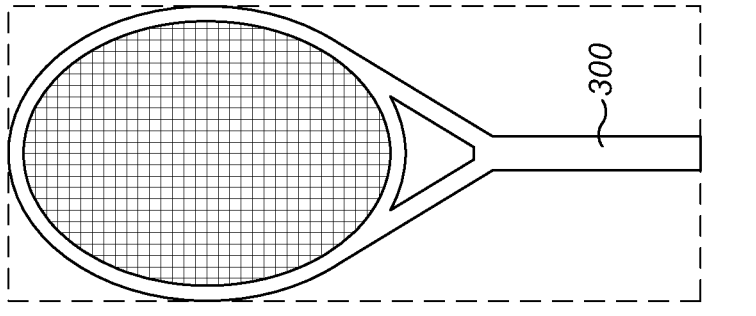
FIG. 3A is an illustration of an example object for which a 3D avatar is to be constructed as part of the present invention.

FIG. 3A illustrates a 2D image of an object 300 classified as a tennis racquet for which semantic/descriptor data is to be derived. Such an image is, for example, a portion of image data captured from camera 202a. FIG. 3B illustrates a 2D skeleton that describes the tennis racquet object 300. As illustrated, the object class 'tennis racquet' can be described by a 2D arrangement of vertices 302a, 302b, 302c, etc. and lines 303a, 303b, etc. that connect the vertices. In this example, the combined arrangement of lines and vertices form the 2D skeleton 301, but the 2D skeleton can be described with reference to only vertices or only connecting lines. In such examples, each vertex is described by an X,Y co-ordinate in 2D space, and each line by a vector in 2D space. The arrangement of the vertices and lines, and the length of the lines, will vary depending on the orientation of the object in the image data, such that the 2D skeleton describes the pose of the object in 2 dimensions.

An alternative example of 2D skeleton derivation is set out below in reference to FIG. 3C. As illustrated in FIG. 3C, the tennis racquet object 304 can be described by a combination of constituent sub-objects 304a, 304b, 304c, each representing a constituent portion of the tennis racquet. In the illustrated example, the sub-objects include objects representing the handle 304a, the throat 304b and the head 304c of the tennis racquet 300. The relative placement and alignment of these constituent sub-objects can describe an alternative 2D skeleton—for example, one can identify of the 'handle' object 304a at a first point in 2D space, the 'throat' object 304b at a second point in 2D space and the 'head' object 304c at a third point in 2D space. The arrangement of the sub-objects will vary depending on the orientation of the object in the image data, such that that the 2D skeleton describes the pose of the object in 2 dimensions, thus representing 2D descriptor information (which itself describes the underlying 2D "semantics" of the object—i.e. the placement of the constituent sub-objects relative to each other).

Optionally, each sub-object 304a, 304b and 304c may also be described in 2D by a plurality of objects forming a 2D sub-skeleton for each sub-object. These sub-skeletons may then be combined to form a larger 2D skeleton, such as the 2D skeleton shown in FIG. 3B. This may be done by aligning aspects of one sub-skeleton with another sub-skeleton based on known sub-object alignments. For example, the method may comprise aligning a determined throat sub-skeleton with a determined handle sub-skeleton by mapping the 2D location of a vertex of the throat sub-skeleton to a 2D location of another vertex of the handle-sub skeleton such that both vertices share the same 2D location.

Figure 4C:
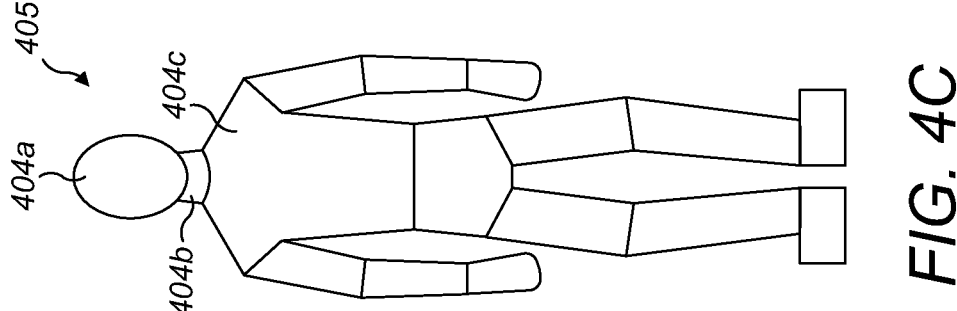
FIG. 4C is an illustration of another example 2D skeleton for the human object of FIG. 3A.
Figure 4B:
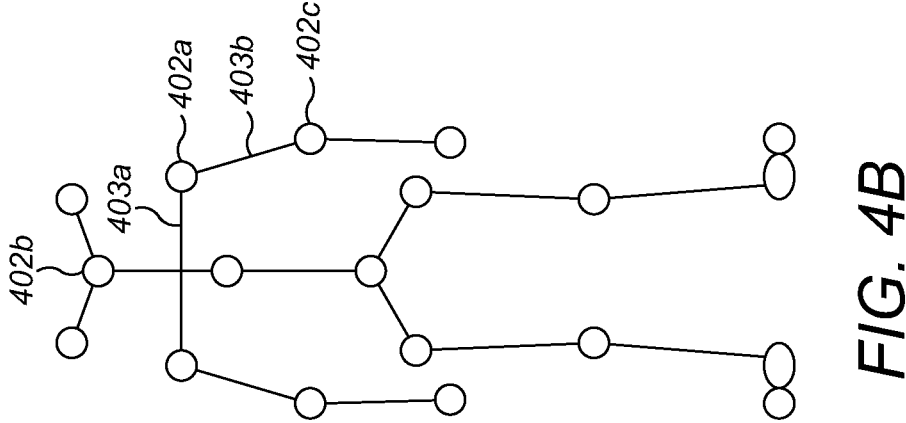
FIG. 4B is an illustration of an example 2D skeleton for the human object of FIG. 3A.
Figure 4A:
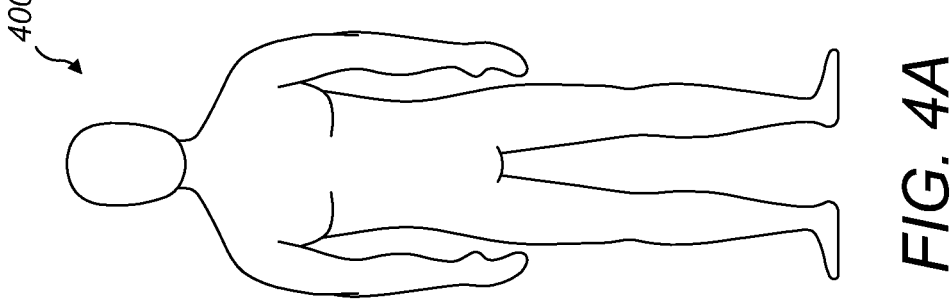
FIG. 4A is an illustration of an example human object for which a 3D avatar is to be constructed as part of the present invention.

FIG. 4A illustrates a 2D image of an object 400 classified as a human being, for which semantic/descriptor data is to be derived. Such an image is, for example, a portion of image data captured from camera 202a. FIG. 4B illustrates a 2D skeleton that describes the human object 400. As illustrated, the object class 'human' can be described by a 2D arrangement of vertices 402a, 402b, 402c, etc. and lines 403a, 403b, etc. that connect the vertices. In this example, the combined arrangement of lines and vertices form the 2D skeleton 401, but the 2D skeleton can be described with reference to only vertices or only connecting lines. In such examples, each vertex is described by an X,Y co-ordinate in 2D space, and each line by a vector in 2D space. The arrangement of the vertices and lines, and the length of the lines, will vary depending on the orientation of the object in the image data, such that the 2D skeleton describes the pose of the object in 2 dimensions.

An alternative example of 2D skeleton derivation for a human object is set out below in reference to FIG. 4C. As illustrated in FIG. 4C, the human object 304 can be described by a combination of constituent sub-objects 404a, 404b and 404c, each representing a constituent portion of the human. In the illustrated example, the sub-objects include objects representing the head 404a, the neck 404b and the torso 404c of the human 400. The relative placement and alignment of these constituent sub-objects can describe an alternative 2D skeleton—for example, one can identify of the 'head' object 404a at a first point in 2D space, the 'neck' object 404b at a second point in 2D space and the 'torso' object 404c at a third point in 2D space. The arrangement of the sub-objects will vary depending on the orientation of the object in the image data, such that that the 2D skeleton describes the pose of the object in 2 dimensions, thus representing 2D descriptor information.

Optionally, each sub-object 404a, 404b and 404c may also be described in 2D by a plurality of objects forming a 2D sub-skeleton for each sub-object. These sub-skeletons may then be combined to form a larger 2D skeleton, such as the 2D skeleton shown in FIG. 4B. This may be done by aligning aspects of one sub-skeleton with another sub-skeleton based on known sub-object alignments. For example, the method may comprise aligning a determined head sub-skeleton with a determined neck sub-skeleton by mapping the 2D location of a vertex of the head sub-skeleton to a 2D location of another vertex of the neck sub-skeleton such that both vertices share the same 2D location.

To identify the sub-objects for an object, the method may comprise performing object detection and classification techniques on the image data that represents the object for which the sub-objects are to be identified. These techniques may be the same as those described above in connection with FIG. 2 for detecting the object. For example, an appropriately trained neural network may be employed to detect features of an object within image data to detect said sub-object, and an appropriately trained neural network may be employed to classify each detected sub-object.

Alternatively, or in addition, the detection and classification of sub-objects for an object 205a may form part of the detection and classification of object 205a, such that, in the method 200 described above, each of said at least one object comprises a plurality of associated sub-objects, and wherein, for each of said at least one object: detecting at least one object comprises detecting each of the plurality of associated sub-objects; and classifying at least one object comprises classifying each of the plurality of associated sub-objects. Thus, determining the 2D skeleton of the classified object comprises identifying features of each of the plurality of classified sub-objects in the image data corresponding to the classified sub-objects. The additional step of detecting sub-objects may be performed by an additional neural network, or as an additional layer or layers in the neural networks implemented for detecting and classifying object 205a. It will be understood that not every sub-object of a larger object needs to be identified and classified in every instance of image data. For example, a complete 3D skeleton can be inferred from a smaller plurality of sub-objects. In the case of a tennis racquet, the placement of the head is known in respect to the throat, so only the handle and throat need to be identified and classified to infer the larger object. Additionally, if sub-objects are occluded in some instances of image data, other cameras having different perspectives may nevertheless capture the object in the image data captures by those cameras. In this manner the method can perform successfully even in the case of occlusions of parts of the object (e.g. occluded by other objects, or cut off at the edge of the field of view of the camera collecting the image data).

The above described exemplary 2D skeletons are provided for illustrative purposes, but it is understood that any arrangement of 2D elements can be used for construction of a 2D skeleton, so long as those elements can be arranged in a manner to describe the size and pose of an object in 2 dimensions.

As stated above, to determine an appropriate positioning of the two dimensional features of the 2D skeleton, a neural network is used. The input of the neural network is the image data 204a corresponding to the classified object 205a (e.g. the image data contained within the bounding box of the classified detected object), and the output is a 2D skeleton 206a that describes the classified object 205a, by an appropriate placement of 2D elements on the image data in the manner described above in connection with FIGS. 3A-C and 4A-C. Any appropriate neural network can be used for the determination, including a convolutional neural network. The neural network is trained using a training set of data comprising multiple images for which appropriate elements of the 2D elements of the 2D skeleton have been identified manually. For example, an image of a training set would be an image of a human being with vertices and lines identified in the manner illustrated in FIG. 4B, or would be an image of a human being with the relative positioning of sub-objects identified in the manner illustrated in FIG. 4C. The training set contains many such images of different kinds of objects viewed from many different perspectives.

The method 200 further comprises constructing a 3D skeleton 208 for the classified object, comprising mapping 207 the determined 2D skeleton 206a to 3D. To map the 2D skeleton to 3D, the 2D elements of the 2D skeleton 206a can be mapped to corresponding points on a three dimensional skeleton which comprises 3D elements that correspond to the 2D elements in the 2D skeleton. For example, when a 2D skeleton is described by X,Y co-ordinates for placement of the neck, shoulders, elbows, hips, knees, feet and hands, then the 3D skeleton is described by X, Y, Z co-ordinates for placement of the neck, shoulders, elbows, hips, knees, feet and hands, and the mapping comprises mapping each point from 2D to 3D. The 3D skeleton is thus a co-ordinate representation of the underlying semantics of the object to be modeled.

Advantageously, a point on the 3D skeleton may be defined by a transformation from another point on the 3D skeleton. For example, where two points are represented by respective values in a co-ordinate system $(X_1, Y_1, \ldots)$ and $(X_2, Y_2, \ldots)$, the second point can be defined as $(X_2, Y_2, \ldots) = T_{12}(X_1, Y_1, \ldots)$, where $T_{12}$ is a suitable transformation from the first point to the second point (e.g. defined by x translation, y translation or z translation in Cartesian coordinates, or a change in length, azimuth and declination in polar coordinates). A third point $(X_3, Y_3, \ldots)$ can be similarly defined by applying a transformation $T_{13}$ relative to the first point, such that $(X_3, Y_3, \ldots) = T_{13}(X_1, Y_1, \ldots)$, or instead applying a transformation $T_{23}$ relative to the second point, such that $(X_3, Y_3, \ldots) = T_{23}(X_2, Y_2, \ldots)$. Thus, the third point can be defined by two successive transformations on the first point—i.e. $(X_3, Y_3, \ldots) = T_{23}T_{12}(X_1, Y_1, \ldots)$. Thus, advantageously, the 3D skeleton comprises an anchor point and a plurality of child points, each child point is defined by applying a transformation to the anchor point or another child point of the plurality of child points. Thus, for each child point the transformation can be a single transformation from a root point or a series of transformations applied in succession, again applied to the root point. The 3D skeleton can therefore be represented by one or more "chains" or networks of points defined relative to the placement of the root point. Thus, by accurate placement of the root point in 3D space, the remaining points of the 3D skeleton can also be placed in 3D space. The transformation between two co-ordinates will be understood by varying the values defining each point in the co-ordinate system.

Furthermore, each point of the 3D skeleton can be defined in a co-ordinate system with six values to define the point in three dimensional space. The six values include three translational values (e.g. up/down, left/right, forward/backward, or similarly length, azimuth and declination) to define the absolute position of the point in 3D space, and three rotational values (pitch, yaw and roll) to define the orientation of the point in 3D space.

In such a co-ordinate system, a transformation from one point on the skeleton to a second point on the skeleton can also be defined by a variation in the six values. For example, a second point can be defined by a translation in one, two or three dimensions, and/or a reorientation of the point about one, two or three axes. As such, upon transformation, each child point of the 3D skeleton can be described not only by a shift in absolute position in three-dimensional space relative to another point, but also a change in orientation relative to the another point. Each child point is therefore defined by an associated transformation, and when a child point is defined by a transformation relative to another child point, the result is equivalent to successive transformations in position and orientation applied to the root point. The root point can be defined by specifying values for each parameter relative to the environment or another object. The position of the root point can be specified by a user or determined from image data in accordance with the methods described above.

Any suitable method can be used to map the 2D skeleton 206a to 3D, including where mapping the determined 2D skeleton to 3D comprises applying statistical and/or probabilistic methods to the determined 2D skeleton and applying holonomic constraints to the statistical methods, resulting in a model of 3D points. Applying the statistical and/or probabilistic methods can comprise applying Non-Linear Estimators, such as an Extended Kalman filter, a particle filter, Unscented Kalman Filter, Grid Partition filters, etc. to the determined points of the 2D skeleton to provide an estimate for the mapping into 3 dimensions to determine the correspondence points on the 3D skeleton. These estimation techniques can be constrained by applying holonomic constraints to the model.

A holonomic constraint is understood to be a known relationship between space (and optionally time) co-ordinates of a system that constrain the possible values of those space (and optionally time) co-ordinates within the system. For example, considering a rigid ball of radius a, the x,y,z co-ordinates of the surface of the ball are constrained by the equation $x^2+y^2+z^2=a^2$. For the present invention, suitable holonomic constraints for each classified object can be applied to constrain the above-described estimation methods. In addition to the example of a ball given above, it will be understood that other pieces of equipment can have appropriate rules (e.g. the points along the length of a rigid pole are constrained by equations describing an elongate rigid body, or the head of a tennis racquet is placed in a specific location in respect of the handle of the racquet and, as will be described in more detail below, the anatomical limitations of a human body can be described by equations to form a holonomic constraint). In each case, said holonomic constraints are employed as equations to reduce the parameter space of possible 3D skeletons that could fit to the points of the 2D skeleton.

In particular, considering the example where the 3D skeleton is described by a root point and a plurality of child points, the holonomic constraints can define limits on which values can vary between points of the 3D skeleton and the amount by which they vary. In particular, the holonomic constraints can constrain the transformation defining each child point, by defining how many of the values are allowed to vary in making the transformation (i.e. the degrees of freedom of the transformation), and the range placed on any variation within each degree of freedom (e.g. the yaw of a transformation is fixed within an angular range, or the absolute length between two points is fixed). Thus, the holonomic constraints may be considered to define the degrees of freedom of the transformation defining each child point and/or the range of possible values for each degree of freedom of the transformation. Equations and/or parameters describing the holonomic constraints can be retrieved from a suitable database for use in the real-time determination of a 3D skeleton.

As an alternative, or in combination with the above described statistical and/or probabilistic methods, other suitable methods to map the 2D skeleton 206a to 3D may be used, including the use of a neural network. The input of the neural network is the 2D skeleton 206a of the classified object 205a and the output is a 3D skeleton 208 that describes the classified object 205a by an appropriate placement of 3D elements. Any appropriate neural network can be used for the determination, including a convolutional neural network. The neural network is trained using a training set of data comprising multiple examples of mappings from 2D elements to 3D elements. This data may have been identified manually, or the 3D skeletons and 2D skeletons may have been determined via simultaneous 2D and 3D observation of an object (wherein the 3D observation can be implemented through any appropriate motion capture technology). The training set contains many different 2D and 3D skeletons of different kinds of objects viewed from many different perspectives.

As described above, a human being can be classed as a "deformable" object. The detection, classification and construction of 2D and 3D skeletons for deformable objects can be performed in the same manner as described above, namely by the implementation of a neural network or neural networks, through appropriate training of that neural network. Specifically, the neural network is trained not only with different kinds of objects in different perspectives, but in a variety of different poses that represent the extent to which it is possible for each object to be deformed (e.g. for a human, many examples are used that demonstrate different positions within the full range of movement of the human body).

While modelling of deformable objects is more challenging than modelling non-deformable objects, human beings represent particularly challenging objects to model. This is because the anatomy of human beings has large degrees of freedom (over two hundred) due to the possible range of positions of each element of the human body (in comparison to simpler deformable objects, such as bows used in archery). In particular, the mapping of the 2D skeleton to 3D skeletons can be difficult because in many angles the 2D elements can be in very close proximity and there can be multiple possible mappings of the 2D points to a 3D skeleton. Thus, there can be significant degrees of freedom in the mapping from 2D to 3D, which increases the complexity of the mapping.

Nevertheless, and as has been described above by reference to examples, the method 200 is implemented such that classifying the at least one detected object 205a comprises classifying a first detected object of the at least one detected object as a human object. The above-mentioned difficulties can be addressed through an appropriate methodology to map the determined 2D human skeleton to 3D. In particular, mapping the determined 2D skeleton to 3D comprises applying statistical and/or probabilistic methods to the determined 2D skeleton and applying human anatomical holonomic constraints to the statistical and/or probabilistic methods to provide a model of 3D points. As described above, applying the statistical and/or probabilistic methods can comprise applying Non-Linear estimators, such as an extended Kalman filter, a particle filter, Unscented Kalman filter, Grid Partition filters, etc. to the 2D skeleton to provide an estimate for the mapping to 3 dimensions. These estimation techniques can be constrained by applying holonomic constraints to the model of 3D points.

As described above, holonomic constraints include equations to constrain the possible parameters when fitting a 2D skeleton to 3D. Holonomic constraints to the anatomy of a human being can include constraints on the entire system of points (e.g. simultaneously specifying placement of all points with respect to each other based on known human spatial proportions), or the holonomic constraints can be applied for specific pairs or groups of points on the 3D skeleton. For example, one human anatomical holonomic constraint can put limits on the dimensionality of a 3D skeletal joint, such as the angle between points or the 3D location of some points with respect to others (e.g. the knee joint will only bend in one direction, or a knee joint must be located between the foot and the hip), or the holonomic constraints can put an upper or lower limit on lengths between points (e.g. ruling out distances between the ankle and the knee that are anatomically impossible). As such, the application of holonomic constraints reduces the dimensionality of the fitting problem in an objective manner, improving the speed and accuracy of the fit. While the human body has more than 200 degrees of freedom, the method can be implemented with fewer degrees (e.g. 58) of freedom to accurately estimate pose and position of a human body. For example, there are over 20 degrees of freedom within the feet (movement of toes, etc), and over 60 degrees of freedom in the spine. The degrees of freedom of the feet do not need to be considered for the purposes of the present invention, since these degrees of freedom are occluded by the shoes. For the spine, the degrees of freedom can be reduced to a much lower number (e.g. 3) since the precision of all degrees of freedom in the spine is not necessary for accurate placement of the human object with respect to the environment or for accurate placement of sub-objects in respect of the spine.

As an example of the application of holonomic constraints, consider again the example where the points of the 3D skeleton comprise an anchor point and a plurality of child points. As further identified above, the holonomic constraints define, for each child point, the number of degrees of freedom and/or a range of values for each degree of freedom. In the context of a human skeleton, the holonomic constraints can therefore constrain the 3D skeleton within the anatomical parameters of a human being. For example, the holonomic constraints can constrain the fitting of 3D points to account for a limited range of movement for a joint of the human body, to account for the fixed length of a bone in the body.

For example, consider the definition of the elbow and wrist joint of the human arm. The wrist joint is separated from the elbow joint by a distance defined by the forearm (e.g. by reference to the length of the radius bone or ulna bone). However, the wrist joint can also rotate relative to the elbow joint—around the axis of the wrist joint (pronation and supination, leading to a rotation of the hand), in a forward and backward direction (flexion and extension, leading to a hand flapping forward and back) and in a side-to-side direction (radial deviation and ulnar deviation, leading to a waving motion). Each of these rotations is limited to a range of possible values (for example, a radial deviation may be within a range of 25-30 degrees and ulnar deviation within a range of 30-40 degrees). Thus, to define the wrist joint, the equations and parameters defining a transformation from the elbow joint will be constrained to only permit values for translational transformation and rotational transformation within set values. Other joints can be reduced in dimensionality in different ways, such as the elbow joint, which does not rotate relative to the shoulder and thus the relative orientation of the elbow joint relative to the shoulder does not need to be considered.

Application of such holonomic constraints can significantly reduce the numbers of degrees of freedom that need to be accounted for when fitting the 3D skeleton from the points of 2D skeleton, by taking into account the objective, real-world constraints on the body that the 3D skeleton is to describe. Furthermore, as identified above, by defining each point of the 3D skeleton by application of a transformation to another point of the skeleton, the problem is further reduced in complexity. In particular, the fitting of each 3D point is fitted and constrained only in relation to the 3D points it is connected to in the 3D skeleton, rather than the more complex problem of attempting a simultaneous fit of all parameters in the skeleton, or attempting to apply holonomic constraints to points of the 3D skeleton that are not directly connected. As also described above, the application of transformations and consideration of holonomic constraints within the application of the transformations allow for separation of sections of the 3D skeleton into a subset of points, in a chain or network, with each subset originating from the root point. Each of these sections of the 3D skeleton can be fitted and constrained independently of the sections in the skeleton without loss of accuracy.

Holonomic constraints to statistical and/or probabilistic methods are discussed above in the context of human objects, but it is understood that similar methods can be applied for the mapping of a 2D skeleton to a 3D skeleton for other deformable objects, through use of appropriate holonomic constraints. For example, in the case of other animals, the holonomic constrains used can be animal anatomical holonomic constraints (e.g. those for a dog, or a horse, etc). As another example, suitable structural holonomic constraints can be applied to a deformable inanimate object. An archery bow, for example, will be significantly deformable in one plane (to model the pulling of the string). As described above with respect to the human object, a holonomic constraint can put limits on the dimensionality of an aspect of the 3D skeleton, such as the angle between points of the 3D skeleton or the 3D location of some points with respect to others in the skeleton (e.g. in an archery bow, the tips of the bow are elastically compressible inward, but not outward, or the grip of the bow must be located between the foot and the hip), or the holonomic constraints can put an upper or lower limit on lengths between points (e.g. ruling out distances between the grip and the tips of the bow that are physically impossible). As such, the application of holonomic constraints reduces the dimensionality of the fitting problem in an objective manner, improving the speed and accuracy of the fit.

The holonomic constraints discussed above are provided to define limitations on points in space, but as mentioned above, holonomic constraints can equally specify time-dependent equations to constrain how the elements of an object vary in time during known kinematic behaviours (e.g. running, walking). The application to kinematic models will be discussed in more detail later.

As an alternative to the use of statistical and/or probabilistic methods, for the classified human object, mapping the determined 2D skeleton to 3D comprises implementation of a neural network. As described above, a suitable neural network (e.g. a convolutional neural network) can be trained through a sufficiently large dataset, including many examples of humans a wide variety of poses.

As a result of the above-described methods, the system is able to generate 3D descriptor information, from input image data, that accurately describes an object detected in an environment without the requirement of additional, dedicated equipment, or computationally intensive pixel-by-pixel processing. The system may then utilise this 3D descriptor information to derive a wide variety of information regarding the objects detected in the image data. For example, the 3D descriptor information for an object can be used to derive precise placement of the object with respect to other objects within the environment and with respect to the 3D environment itself. For example, in the context of a football game, the 3D descriptor information for multiple players and for the football may be compared to the 3D environment to accurately determine if specific placement criteria have been complied with (e.g. compliance with the offside rule). While the placement criteria may be dictated by rules for a game, the accurate determination of whether or not real-world objects fulfil such placement criteria is still a significant technical challenge solved by the present invention.

Additionally, the 3D descriptor information may be used to determine other characteristics and/or properties of the objects detected in the environment. These characteristics can also be determined from 4D descriptor data using temporal information for time-ordered data (which will be described in more detail below). For example, the speed and/or acceleration of any one detected object may be accurately determined (e.g. for comparison with existing records for objects in the same context). As another example, the movements of a deformable object can be determined (e.g. maximum joint angle, orientation of limb when a player assumes a specific pose and posture). Additionally, proximity and interactions between objects may be accurately recorded (e.g. jump height, number of times a player has had contact with the ball, the length of time that a player has been in possession of the ball). The characteristics and/or properties may be determined automatically by any suitable pre-programmed equations and in real-time (and at the same time as determination of the 3D data), but also manually by an operator after calculation of the model. Thus, optionally, the method may further include, for each classified object of the classified at least one object, using the constructed 3D skeleton of the classified object to derive properties of the classified object. The properties may include, for example, three dimensional location information regarding the position of the classified object with respect to the camera, or may include 3D location data for sub-object or sub-objects of the classified object with respect to other sub-objects of the same classified object.

Advantageously, the method may also comprise constructing a 3D avatar 210 for the classified object 205a comprising integrating the constructed 3D skeleton 208 with a 3D model corresponding to the classified object. The 3D model is a representation of the object to be modelled, and can include high-resolution surface textures representing surfaces of that object. A 3D model can comprise 3D elements that correspond to the constructed 3D skeleton 208. As such, a straightforward mapping can be implemented such that the 3D model maps directly onto the constructed 3D skeleton to produce a 3D representation of the object 205a, including a representation of the size and pose information of the object in the image. The 3D model is pre-rendered, so does not have to be generated 'on the fly'. The only real-time component data that is generated is the 2D descriptor data and the 3D descriptor data, as described above. The derivation of such intermediate descriptor data is significantly computationally faster and easier than a direct pixel-by-pixel reconstruction of the 3D scene, due to the large volume of data used to describe 3D models. As such, the method 200 set out above achieves the aim of deriving an accurate 3D representation of an object from image data in a manner that is easier and computationally efficient.

Additionally, the method enables generation of high resolution 3D images from low-resolution input image data (which is not possible using existing techniques). Namely, for a pixel-by-pixel analysis and reconstruction of a 3D scene, the image resolution of the final output model would be limited by the resolution of the input image data. For example, if the captured image data of a football match is made up of low-resolution images or video from a television feed, then the final output models of the scene would correspondingly limited (i.e. 3D/4D models could not be produced at a resolution higher than the input data). By contrast, the methods of the present invention described above would not construct the final model directly from the low resolution TV image—the low resolution TV image is only used to derive the 3D descriptor data, upon which can be mapped a pre-generated 3D model of higher resolution. The high resolution pre-generated models can be generated, for example, by 3D scanning of objects using photogrammetry techniques.

The pre-generated models may be generic models maintained at a database or, advantageously, the methods of the present invention may themselves also include the process of pre-generating unique 3D models of the objects for mapping to the 3D skeleton. That is, the methods described herein may further comprise, for each classified object of the classified at least one object, a step of capturing a 3D model of the classified object using a photogrammetry system. In particular, the method may further comprise capturing the 3D model corresponding to the classified object at a higher resolution than the resolution of the image data.

The above described methods need not be limited to modelling one class of object —classifying the at least one detected object comprises classifying a second detected object of the at least one detected object as a non-human object. After the object is classified, an appropriate neural network is identified for appropriate analysis of the classified object.

Method 200 has been described above in reference to image data of the environment collected by one camera 202a. This method can be improved by collection of image data from a plurality of cameras. Namely, further image data 204b, 204c . . . 204z of the same environment may be collected. Each instance of additional image data is collected from a respective one additional cameras 202b, 202c . . . 202z. As described above for camera 202a, each additional cameras 202b, 202c . . . 202z can be any vision system suitable for collecting image data, including (but not limited to) a 2D camera, a 2D video camera, a 3D depth camera, a 3D depth video camera, a Light Detecting and Ranging (LIDAR). The camera 202a thereby produces appropriate image data 204a (e.g. 2D images, 2D video, 3D images, 3D video, LIDAR data). Each camera is located at a different position with respect to the environment, and each instance of image data correspondingly provides an alternative representation of the environment (e.g. different position, different angle, different field of view, etc). As such, an object to be detected, classified and modelled may be depicted in multiple alternative instances of image data representing the scene.

Each step of the above described method 200 can be applied to each instance of further image data 204b, 204c . . . 204z to identify a specific classified object 205b, 205c . . . 205z in the respective instance of further image data 204b, 204c . . . 204z. The same object is classified in each of the instances of image data, such that the method comprises providing a plurality of instances 205a . . . 205z of the same object, classified based on image data provided from different perspectives. Thus the method is improved in that detecting at least one object comprises detecting said at least one object in image data collected from each camera and classifying the at least one object comprises classifying said at least one object detected in the image data from each camera.

Furthermore, determining the 2D skeleton for each classified object comprises determining a plurality of 2D skeletons, each of said plurality of 2D skeletons determined from identifying features of the classified object in image data collected from a different camera of the plurality of cameras. Thus, classifying an object in each instance of image data 204a, 204b . . . 204z enables the refinement of the descriptor data determined from the image data, since the method enables the determination of multiple versions 206a, 206b . . . 206z of a 2D skeleton for one object, each 2D skeleton describing a respective different instance 205a, 205b . . . 205z of the classified object. Information describing the position and orientation of each camera 202a . . . 202z is known to the method, thus enabling the association of each instance of image data with information about its source. This information may be contained in the received image data, or the information may be pre-determined prior to the start of the method.

The method further comprises wherein constructing the 3D skeleton comprises combining the determined plurality of determined 2D skeletons. Providing multiple views of the same 2D skeleton, but from different perspectives, triangulates each element of the classified object in 3D space, thus constraining the degrees of freedom available in mapping the 2D skeleton to a 3D skeleton. A correspondence is identified between objects and/or sub-objects identified in different cameras, and the relationship between those cameras utilized to triangulate the 3D location of the object or sub-object with respect to the location of each camera.

For example, for a specific point on a determined 2D skeleton 205a determined from an instance of image data 204a, a line can be drawn from the X,Y,Z co-ordinate of the location of the camera 202a used to capture that instance of image data 204a, through the location of the specific point to be determined (i.e., the vector from the camera location extending through the 2D location on the image plane). A similar process is performed for each camera 202b, 202c . . . 202z, resulting in a plurality of 3D vectors. The point in 3D space with a minimum distance to all lines (such as a Euclidean or Mahalanobis distance) is determined as the 3D co-ordinate for the specific point on the 2D skeleton. This process is repeated for all points on the 2D skeleton to construct a plurality of 3D points to make up the 3D skeleton. The above described method is exemplary only, and it will be understood that any suitable statistical and/or probabilistic method can be applied to simultaneously map to a point in 3D space from a plurality of corresponding points in 2D collected from cameras at known positions, so as to map the plurality of 2D skeletons to the same 3D skeleton. As will be set out in more detail below, this methodology can be refined through collection of time-varying image data and determined 2D skeletons across time.

The above identified method can be performed with significantly improved computational efficiency. In particular, under an approach through pixel-by-pixel comparisons, to find a correspondence between multiple cameras requires attempting to find the correspondence between millions of pixels in different instances of image data (which requires trillions of comparisons to be made). By contrast, the present method involves ascertaining the correspondence between elements of determined 2D skeletons (which, depending on the object, might be anywhere from 1 element to 1000 elements). As such, significantly fewer comparisons need to be made to determine a final element of the 3D skeleton.

It will be appreciated that any suitable estimator model can be implemented to achieve the triangulation of points from multiple 2D skeletons. For example, non-linear statistical and/or probabilistic models can be implemented and/or neural networks can be implemented that have been suitably trained (e.g. trained to triangulate a 3D point from the plurality of lines described above).

Typically, triangulation requires at least two cameras to provide an accurate estimation of a single point in 3D space, but the more cameras that are used, the more accurate the final determination. The above described method is possible through the use of a single camera without triangulation techniques. While triangulation will not be possible from a single image, the system is still able to accurately identify and classify each object from a single instance of image data, and furthermore may accurately identify each 2D element of a 2D skeleton since each individual element is understood to be present in combination of other elements of the skeleton, thus constraining the degrees of freedom of any one point in a specific skeleton to be mapped. The accuracy of fitting of a 2D skeleton to a single instance of image data can be supplemented by any number of auxiliary methods, including dense mapping techniques. These same auxiliary methods may also be used to improve the accuracy of 2D skeleton determination from multiple instances of image data from different cameras. The above described method has described the construction of a 3D model representing an object depicted by static image data, from a single camera or from multiple cameras. Nevertheless, the above described method can also be applied to video image data comprising a time ordered sequence of frames, by applying each step of the method to individual frames of the time-ordered sequence of frames. Thus, the final derived descriptor data comprises a plurality of time-ordered sets of 3D descriptor data that describes a classified object both temporally any spatially. The 3D descriptor data can then be used for construction of a 4D model (i.e. a temporal 3D model) of an object depicted in image data. For example, the time-ordered sequence of frames could be a live video feed from cameras located at a football stadium. The herein described method steps can be applied in real-time to the frames of the live video feed to allow for a real-time generation of a 4D model.

Figure 5:
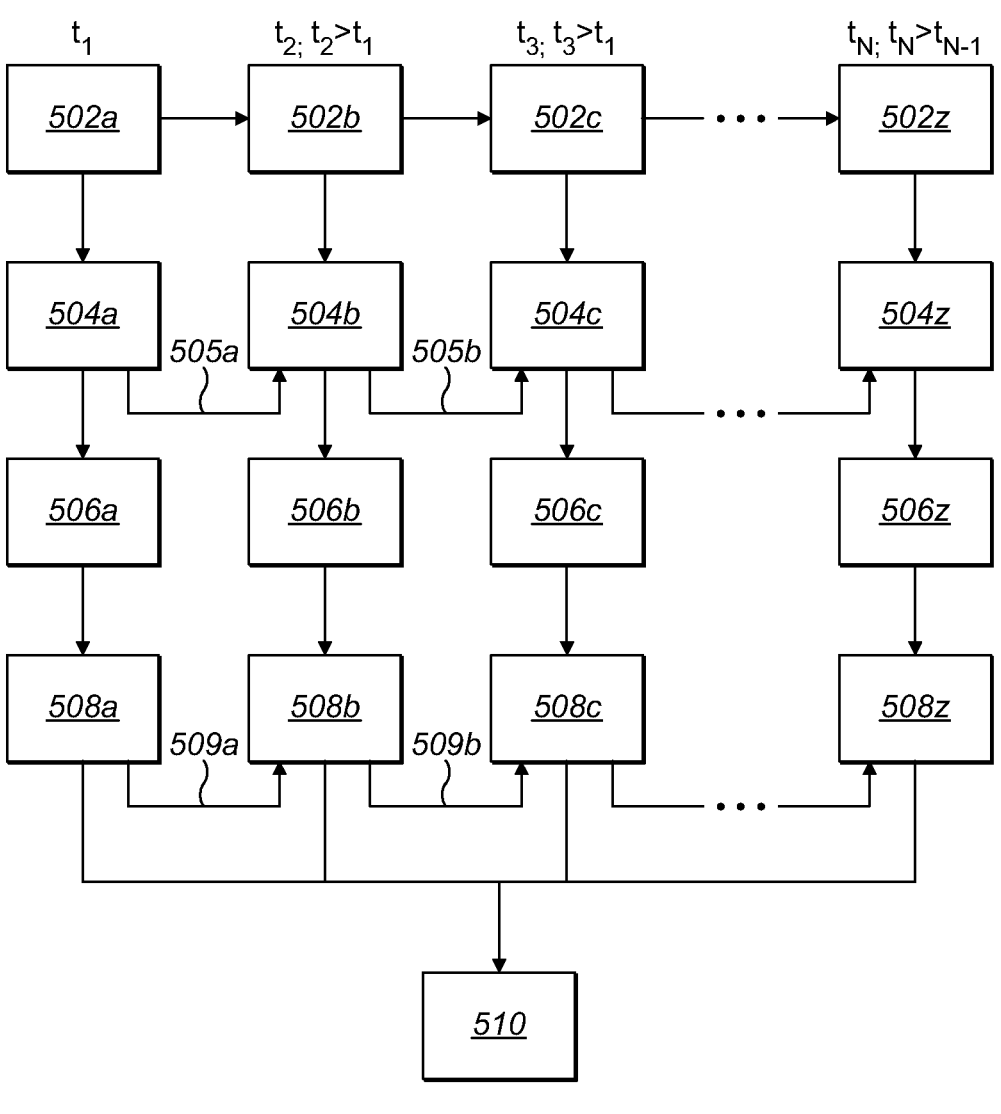
FIG. 5 is a flow chart illustrating an exemplary method for constructing a 3D avatar based on image data including a time-ordered series, according to the present invention.

A refined method 500 is illustrated in FIG. 5, in which the steps of method 200 described above is applied to image data 502 collected from each camera of the at least one cameras, where said image data 502 comprises a time-ordered sequence of frames 502a, 502b, 502c . . . 502z. In the same manner as set out above in respect to FIG. 2, the detection and classification of objects within the environment is applied to individual frames (e.g. 502a or 502b) of the time-ordered sequence of frames 502a, 502b, 502c . . . 502z. Thus, said detecting at least one object within the environment comprises detecting said at least one object in each frame of the time-ordered sequence of frames 504a, 504b, 504c . . . 504z, and said classifying the at least one detected objects comprises classifying the at least one detected object in each frame of the sequence of frames 504a, 504b, 504c . . . 504z. As a result, the method provides a time-ordered series of classified objects 504a, 504b, 504c . . . 504z. In the illustrated example, a single object is discussed and each of classified objects 504a, 504b, 504c . . . 504z is the same classified object, albeit identified at different points in time. It is understood that the method 500 can also identify a plurality of objects in the time-ordered sequence of frames, and each classified object of the classified at least one objects is tracked across the time-ordered sequence of frames. Since each object is classified by the method 500, the method is able to identify each object in the image data, thus allowing individual tracking of the object across multiple frames.

Advantageously, each classified object is tracked across the time-ordered sequence of frames by implementing a recursive estimator. In this manner, the classification of an object 504a in a first frame 502a is used by the method to assist in the classification of object 504b in second frame 502b. For example, for the process of detecting object 504b, the input to the detection method includes both the individual frame of image data 502b and the output 505a of the steps of detection and classification of object 504a. Thus, the detection and classification of object 504b is refined by the output of detection and classification of an object in a previous time instance. Similarly, the output 505b of the detection and classification of object 504b can be used to refine the detection and classification of object 504c. Any form of statistical and/or probabilistic methods may be used as a recursive estimator in which data from one time point can be used as an input to a derive information at a subsequent time point. One such recursive estimator can be a neural network.

Such tracking is known as "object" tracking. Object tracking can be achieved by any of a variety of methods, including Motion Model Tracking (including the use of Kalman filters, the Kanade-Lucas-Tomashi Method (KLT), mean shift tracking and optical flow calculation) and Vision Based Tracking (including the application of Deep Neural Networks such as online and offline Convolutional Neural Networks (CNN), Convolutional Long Short Term Memory (ConvLS™), etc).

The implementation of such a tracking method is advantageous in instances where multiple objects of the same class are present in a single video stream. A typical detection and classification method might be able to accurately identify the presence of two objects of the same class, and be able to recognise the two objects as being unique instances of object in the same class. However, if presented with a second image with a further example of the same two objects, the method would not be able to identify which object is which. Method 500, through refining the object detection and classification of each frame in the context of preceding frames, is able to uniquely identify each classified object in each individual frame of image data.

However, in an example when groups of objects in the same class come within close proximity at a specific time instant, the objects may no longer be uniquely tracked after separation of said objects after said specific time instant. Thus, mere tracking alone of the objects may not be sufficient to uniquely distinguish between the different objects that frequently come within close proximity. The method 500 may be refined to address this possibility by the application of the above-described object identification step, improving the accuracy of unique identification of individual objects, even during and after instances of close proximity. Alternatively, or in addition, image data from an additional camera located at a different position (and having a different viewpoint) might be incorporated into the method as an additional camera of the plurality of cameras described above.

Further alternatively, or in addition, the method may comprise receiving input from an observer of the real-time processing of image data who can manually tag each classified object into a subclass at a time period shortly after the instant of close proximity. Thereafter, tracking of said objects will once again be able to uniquely identify each object in each time instance. Manual tagging may also occur at the initiation of the method and upon first identification of the classified objects to ensure tracking from instantiation can uniquely identify each classified object.

In the same manner as set out above in respect to FIG. 2, the step of determining a 2D skeleton is applied to individual classified objects (e.g. 504a or 504b) of the time-ordered sequence of classified objects 504a, 504b, 504c . . . 504z, to produce a time-ordered sequence of 2D skeletons 506a, 506b, 506c . . . 506z. Similarly, and as set out above in respect to FIG. 2, the step of constructing a 3D skeleton is applied to individual determined 2D skeletons (e.g. 504a or 504b) of the time-ordered sequence of classified objects 506a, 506b, 506c . . . 506z, to produce a time-ordered sequence of 3D skeletons 508a, 508b, 508c . . . 508z.

Advantageously, for each classified object, mapping the determined 2D skeleton to 3D comprises applying a recursive estimator across the time-ordered sequence of frames. In this manner, the derived 3D skeleton 508a at a first time instance is used as a further input 509a to the derivation of a second 3D skeleton 508b of the same object at a later time instance. The use of such temporal information provides a further degree of precision and accuracy on the complex problem of deriving placement of a 3D skeleton on a moving object. This refines the method by not only ruling out certain placements of 3D features (e.g. it would be physically impossible for a human body to execute a leg movement to kick a ball in a fraction of a second), but also helps to map detected movements upon well-recognised movements (e.g. that motion of kicking a ball has a well-observed pattern of movement, which can be fitted to time-dependent placements of 3D features). Any form of statistical and/or probabilistic methods may be used as a recursive estimator in which data from one time point can be used as an input to a derive information at a subsequent time point. An example of a recursive estimator is a neural network (such as a convolutional neural network). Such a neural network is trained using time-dependent 3D input data collected by observing objects undergoing various different movements. For example, a human can be recoded using motion capture technology (e.g. placement of optical markers on an individual and observing that individual carrying out a variety of actions).

As discussed above, holonomic constraints can be applied to statistical and/or probabilistic methods to constrain the co-ordinates of a system in space. Advantageously, the recursive estimator can also implement time-dependent holonomic constraints for the fitting of a 3D skeleton across time (i.e. in 4D). The time-dependent holonomic constraints are implemented by kinematic models to constrain the points of the 3D skeleton across the time-ordered sequence of frames. The kinematic models represent the 3D co-ordinates of a point or group of points of a 3D skeleton in time. Thus, when attempting to fit these point of a 3D skeleton at a time t, the available values for those points are constrained not only by the physical holonomic constraints (as detailed above), but also the determined values for those points at an earlier time t−1, and a kinematic model defining a relationship between the points at time t and time t−1. Examples of kinematic models might be equations describing the movement in time of different points on the human body as the human engages in different activities (e.g. running, walking, serving a ball with a tennis racquet, etc). Other kinematic models might be equations describing the elastic deformation of a non-rigid body under application of a force (e.g. high jump pole or an archery bow). Additionally, kinematic equations might describe the interaction of an object with an external environment (for example, the movement of an object, such as a ball, through 3D space under the influence of gravity, or the movement of balls bouncing or rolling across a flat surface).

One example of implementation of time-dependent holonomic constraints of the 3D skeleton is through the use of a hidden Markov model, by considering the equations:

$$X_t = f_h(X_{t-1}, u_t) \tag{1}$$

$$Y_t = g_c(X_t) \tag{2}$$

where $X_t$ is the vector of states of elements of the 3D skeleton of object h (e.g. for a human object, $X_t$ is the vector of the joints of the human skeleton in 3D space, $X_t = [x_{leftwrist}, y_{leftwrist}, z_{leftwrist}, x_{head} \ldots]$).

$X_t$ represents a "hidden state" of the hidden Markov model, and is itself not directly measured. $X_t$ is instead inferred from a measurement of the object—in this case, $Y_t$ is the measurement vector of the observed object h. In the case of observing the object h through a set of cameras c then $$Y_t = \left[ x_{leftwrist}^{cam1}, y_{leftwrist}^{cam1}, x_{leftwrist}^{cam2}, y_{leftwrist}^{cam2}, \ldots \right]$$

measured in pixel co-ordinates. The function $g_c$ is the measurement model that transforms from the space describing $X_t$ (the hidden state of the 3D descriptor data) to the measurement space of the data $Y_t$ of the cameras. In the hidden Markov model, the hidden states $X_t$ are modelled as a Markov process, in that the probability of a state occurring depends only on the previous event, and not on any of the other states (i.e. the probability of state $X_t$ occurring depends only on the previous state $X_{t-1}$). Equation (1) describes this relationship, where for each possibility of $X_t$, the function $f_h(X_{t-1}, u_t)$ provides the probability of that system being in that state.

The aim of predictive model is to find the best estimation of $X_t$ from measurement $Y_t$, with refinement from measurement $Y_{t-1}$. Namely, the measured $Y_t$ values yield $X_t$ values from application of the measurement function $g_c$, the measured $Y_{t-1}$ values yield $X_{t-1}$ values from application of the measurement function $g_c$, and further the determined values $X_{t-1}$ are used to derive an estimate of $X_t$ by use of function $f_h$. In particular, the system first determines the most probable value $X_t$ from $f_h(X_{t-1}, u_t)$. The system then determines an $X_t$ from the measured $Y_t$ value and the measurement function $g_c$. The final value for the state $X_t$ is then refined by optimizing the value for $X_t$ based on the value inferred from $X_{t-1}$ and the value determined from $Y_t$. For example, a Kalmann filter is used to minimize the residual error between the value for $X_t$ based on the value inferred from $X_{t-1}$ and the value determined from $Y_t$.

The function $f_h$ describes the kinematic model of the object h, which incorporates the spatial holonomic constraints described above together with how those points in space vary in time for different types of kinematic movement, thus defining time-dependent holonomic constraints for the kinematic model. As described above, the spatial holonomic constraints will constrain, for each point of the 3D skeleton, the number of degrees of freedom and/or ranges of the available degrees of freedom. The time-dependent holonomic constraints will additionally constrain, in time, the degrees of freedom.

Considering the example of the 3D skeleton comprises an anchor point and a plurality of child points, each child point is defined by applying a transformation to the anchor point or another child point of the plurality of child points, the time-varying 3D skeleton is defined by time-variable transformations for each child point. For example, the value differences between two points of the 3D skeleton will change in time, and these differences in values are represented by different transformations at each point in time. The time-dependent holonomic constraints define, for each point in time, the degrees of freedom of transformation defining each child point and/or the range of possible values for each degree of freedom of the transformation. The amount by which the time can vary will depend on the time interval between measurements, the kinematic model chosen and other parameters such as $u_t$ (set out below). The time dependent holonomic constraints are advantageously applied in combination with the spatial holonomic constraints.

For example, $f_h$ includes holonomic constraints to constrain the relative orientation of the knee, hip ankle, as well as how the knee, hip and ankle move with respect to each other in time for a specific kind of kinematic motion (e.g. running). The holonomic constraint may limit the degrees of freedom available in defining the 3D points describing the leg to those of a human running—for example, during running the ankle joint is not expected to demonstrate significant pronation or supination, so this degree of freedom for the ankle could be removed entirely, or constrained to smaller values characteristic of a running human.

$u_t$ describes the control inputs for the kinematic model (eg. the rotational speed of joints such as the left elbow for human anatomical constraints, or the gravitational constant of earth g, being approx 9.807 $ms^{-2}$, for use in kinematic models of objects in motion under the influence of gravity, or co-efficients of friction between an object and various types of material). These values can be measured or calculated prior to the application of the method, such as through motion capture measurement of an individual or object, with methods known in the art. $u_t$ can include also include variable inputs for the kinematic model, including values for the state $X_{t-1}$, and thus itself partly describe the state $X_{t-1}$ (e.g. the velocity of a leg measured at time t−1, or angular velocity of a torso). Optionally, these variable values for $u_t$ can be measured alongside the camera observations Y, through suitable physical sensors in the environment (e.g. LIDAR or a 3D depth camera). Additionally or alternatively, one or more values for $u_t$ can form part of the hidden state to be inferred from measurements Y. The value for $u_t$ need only be an approximate measure, since it is used primarily to infer an estimate for $X_t$, which is refined by measurement of $Y_{t-1}$.

The function $f_h$ is the kinematic model for specific object h, and different $f_h$ functions can be applied to describe kinematic models for other types of object (e.g. human objects have one $f_h$ equation, balls have another $f_h$ equation etc.). However, the same kinematic model $f_h$ can be used for all objects of the same class (e.g. the same $f_h$ is used for every ball to be modeled). Different kinematic models can also be applied for different sub-classes, or the same kinematic model can be applied, but with different parameters (e.g. the same $f_h$ equations are applied for different humans, but with different parameters since different humans will vary in body dimensions and the gait of humans will vary when running).

Thus, for any one object h, knowing measurements $Y_t$, $Y_{t-1}, \ldots, u_t, u_{t-1}, \ldots$ and $f_h$, one can find the best estimation of $X_t$. The system is further advantageous, since the $Y_t$ vector in these cases describe only the measurement data for individual objects, and $X_t$ describes the 3D skeleton information for that object, meaning the number of parameters that must be simultaneously fitted by the system is significantly lower than a pixel-by-pixel comparison, which would involve modelling time-dependent kinematics of millions of pixels (resulting in trillions of comparisons). The hidden Markov model described above is merely exemplary of methods that might be used to implement time-dependent holonomic constraints to non-linear estimator processes to refine a time-dependent 3D skeleton determined from time-evolving image data.

The time-ordered sequence of frames described above can includes frames captured by multiple cameras within the environment, where each camera is operating at the same frame rate and the cameras are synchronized such that at each time point image data is available from more than one perspective. This allows for the fit for the 3D model to be constrained at each timepoint by triangulation as described above, but also constrained using the recursive estimators as described above. This leads to an improved overall accuracy of the determined 4D descriptor information.

In addition, through the use of the recursive estimators, the method described above is performed when the at least one camera comprises at least one first type of camera and at least one second type of camera, wherein each of the first type of camera captures image data at a first framerate, and each second type of camera captures image data at a second framerate that is different to the first framerate. Any number of cameras may be operating at the first framerate or the second frame rate, and there may be further cameras operating at yet different framerates. Commonly used frame rates are 24 frames per second (fps) and 60 fps, but data can be collected at higher rates of 120, 240 and 300 fps. Thus, the time-ordered sequence of frames that includes frames collected from multiple cameras may include variable number of frames at each time instant, including some time instants where only one frame has been captured.

With recursive estimators as described above, similar constraints on the 3D skeleton are possible even for 3D skeletons determined at time points for which there is only a single frame in the combined time-ordered sequence of frames. For such frames, the 3D skeleton determined from the 2D image can be constrained and refined by the 3D skeleton fitted from images at earlier time points. For example, in the hidden Markov model above, the $Y_t$ data includes a single frame, from which $X_t$ is determined to refine an estimate of $X_t$ inferred from the previous time state $X_{t-1}$. Such a method and system is advantageous over one which would not employ recursive estimators and instead separately calculate 3D skeletons for individual time points without knowledge of past history. Such systems using image data collected from cameras that are not exactly synchronised would produce a time-dependent model of varying accuracy due to the inconsistent number of cameras used at each time point. Advantageously, the above-described methods using recursive estimators can be used to determine 4D descriptor data from multiple cameras that are not only having different frame rates but also cameras that are at the same framerate but are asynchronous.

Further advantageously, the use of recursive estimators can enable the determination and tracking of a 3D skeleton from data collected by a single camera only, where each 3D skeleton determined from an individual frame in the time-ordered sequence of frames is refined from an estimate of a 3D skeleton from a previous frame, through applying the recursive estimators. Accuracy can still be provided even without triangulation from multiple cameras, so long as a 3D skeleton is determined accurately for an initial state. Such an application may be advantageous, for example, in situations where a human or object may temporarily move from a region being monitored by multiple cameras to a region only by one camera. The object will be accurately tracked up until the human or object moves from the region monitored by multiple cameras, thus providing an initial accurate input of the 3D skeleton at the start of single-camera tracking region. The 3D skeleton can be continued to be determined and tracked in time by the one camera until the human or object returns to the region monitored by the multiple cameras. For example, in the context of a football game, a human player may be running on the pitch past a structure that obscures all but one camera. The system thus allows for continued, accurate tracking where systems known in the art might fail.

The above described methods thus allow for continued accuracy even during periods with reduced amount of information input in image data, but also a more flexible system since the method can incorporate additional image data from cameras that have not been specifically configured to be synchronized with existing cameras. For example, a temporary camera might be quickly set up to cover a reduced visibility region, or camera data from viewers in the audience of a sporting match can be incorporated into the fitting process of 3D skeletons of objects in that sporting match.

The output of method 500 is a 4D skeleton 510 of the classified object (i.e. a temporal representation of 3D object information). Each frame of this 4D skeleton can be mapped to a 3D avatar in the manner described above in connection with FIG. 2, thus providing a 4D avatar. While FIG. 5 has been illustrated with respect of a single camera, it is understood that the method described in respect of FIG. 5 may also be applied simultaneously to each instance of image data received from the multiple cameras. Thus, each example 506a, 506b, 506c . . . 506z of the determined 2D skeleton illustrated in FIG. 5 is understood to comprise multiple 2D skeletons in the manner described above in respect to FIG. 2, and the plurality of 2D skeletons determined from each instance of image data is used to determine an individual 3D skeleton as illustrated in 508a, 508b, 508c . . . 508z. Thus, in the example where multiple cameras are used for method 500, the output is a single time-ordered sequence of 3D skeletons 508a . . . 508z, which can be refined in the same manner as described above.

Advantageously, the method may further include, for each classified object of the classified at least one object, using the 4D skeleton of the classified object to derive properties of the classified object as described above. The properties may include, for example, time-varying three dimensional location information regarding the time-dependent position of the classified object with respect to the camera, or may include time-varying three dimensional location data for sub-object or sub-objects of the classified object with respect to other sub-objects of the same classified object.

For example, where the classified object is a person (for example, a player of a sport), the method may use the 3D skeleton to derive from a sequence of images one or more of: a position of the person (either in a two dimensional sense as a position on the ground, or in a three dimensional sense, should the person jump), a speed (or velocity) of the person, an acceleration of the person.

In a further example, a collection of classified objects may represent players of a sport and a further object may represent an item of apparatus for that sport (for example, a ball), the method may use the 3D skeletons of the players to identify interactions between the players and the item of apparatus. The method may derive the timing of the interaction. The interactions may include contact between the players and the item of apparatus.

In a further example, a collection of classified objects may represent players of a sport and further classified objects may represent an item of apparatus for that sport carried by the players (for example, a bat or racket) and/or a ball, the method may use the 3D skeletons of the players and the carried items of apparatus to identify interactions between any of the players and the items of apparatus, or between the items of apparatus. The interactions may include contact between the classified objects. In the example of a football game, such interactions may include a player touching a ball with any part of his/her body, including a foot or a hand. As will be described below, this interaction may be used as part of determining compliance with the offside rule.

For example, in a game of football, the method may use a plurality of 3D skeletons representing players and an object representing a ball to derive from a sequence of images whether a rule, such as the offside rule, was infringed during the sequence of images.

As discussed above, a processing speed advantage is obtained by not generating 3D textures 'on the fly', but rather mapping existing textures to 3D skeleton. However, the method can nevertheless be refined by generation of some 3D textures for combination with the 3D model applied to the 3D skeleton. In particular, the method may comprise generating a 3D surface mesh from the received image data, and mapping the derived 3D surface mesh to the 3D skeleton in combination with the 3D model. An example of a surface mesh may be a mesh with a surface describe clothing features, or a mesh with a surface describing facial features. The mesh may be derived from image data for an object, or from image data corresponding to a sub-object of an object.

For example, the object may be a football, and the 3D mesh describes a surface of the football and is derived from the image data for that football. As another example, the sub-object may be a face of a human object, and the 3D mesh describes a facial surface and may be derived from the image data corresponding to that face. The image data maybe collected from a single camera, or of the same object from multiple cameras, in which the image data from each camera has been merged. Any suitable image processing technique may be used to derive the 3D mesh from the image data, including but not limited to neural networks (such as convolutional neural networks). Such a neural network (or neural networks) can be trained on training data with outputs of multiple 3D surfaces for different objects, and the inputs are a plurality of flattened 2D perspectives corresponding to each 3D surface output. The 3D mesh can be mapped to the 3D skeleton in a similar manner as the 3D model can be mapped to the 3D skeleton—namely, the 3D mesh can be mapped to a corresponding point on the 3D skeleton (e.g. the face 3D mesh mapped to the head point of the 3D skeleton). Using custom 3D meshes for parts of an object in combination with a pre-rendered 3D model means that elements that are unique to a certain object (e.g. face) can be more accurately rendered, but pre-determined 3D models can be used for the remainder of the model. Thus, a balance can be provided that provides accuracy where needed while still reducing processing speed to enable real-time processing.

Figure 6:
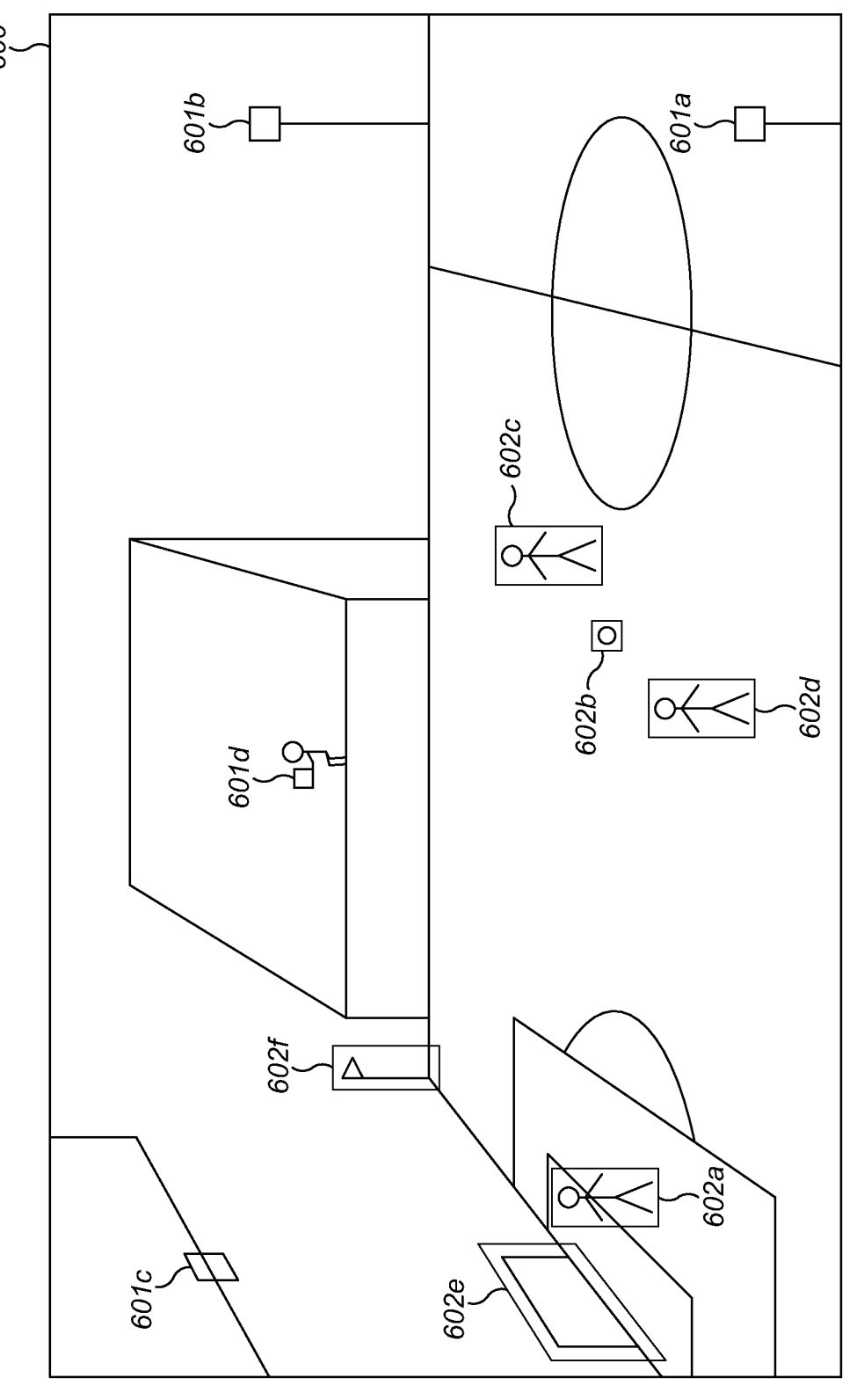
FIG. 6 is an illustration of an exemplary environment depicted within received image data.

FIG. 6 illustrates an environment 600 in which the present invention can be implemented. The environment includes a plurality of cameras 601*a* . . . 601*d*. The cameras can include stationary cameras 601*a* and 601*b*. Such stationary cameras may have a fixed field of view and viewing angle, or may be able to rotate and/or zoom. The cameras can include a moveable camera 601*c*, which is able to translate with respect to the environment and again may have a fixed field of view and viewing angle, or may be able to rotate and/or zoom. Additionally, the cameras can include a handheld camera 601*d*, for example one held by a spectator in the audience. Each camera can each be of the different types of vision system as described above.

The environment includes multiple objects 602*a* . . . 602*d*. The methods described above may be employed to receive image data collected from the multiple cameras 601*a* . . . 601*d*, and thus identify each object of the multiple objects to construct a 3D/4D avatar for each object. The method does not necessarily construct 3D avatars for every identified object 602*a* . . . 602*d*, and may only construct 3D avatars for a specific kinds of object classes. For example, object 602*e* is a goalpost and object 602*f* is a corner flag—these objects are static objects that do not change their position or shape—this information is already known as a result of identifying the class and the location of the object in the environment. As such, the 2D descriptor and 3D descriptor information does not need to re-derived.

The above-described methods enable the generation of multiple 3D/4D avatars for objects located within the environment. Given that the avatars are generated by cameras for which the position and orientation are known, the avatars are generated with a known 4D location with respect to the environment. It is desirable to also generate a 3D environment in an orientation with respect to the 3D avatars that is consistent with the orientation of a real-world environment in which the objects are placed. The 3D avatars can then be placed into the 3D environment for a more complete reproduction of the data captured by the cameras.

The methods may further comprise generating a 3D model of the environment. This model may be generated in the absence of image data from a calibration of the cameras used to capture the image data prior to the performance of any method. For example, a plurality of cameras may be set up with known locations and orientations in respect to an environment. Because the locations and orientations are known, a pre-generated environment can be mapped to the corresponding locations.

In a further advantageous refinement of the above described methods, the methods further comprise constructing, from the image data, a 3D model of the environment. Specifically, the same image data used to generate the 3D/4D avatars of objects within the environment 600 is also used to generate the environment 600 itself. Such a method is advantageous in circumstances where the cameras used to collect the image data are not stationary, or where the position/orientation of stationary cameras with respect to the environment is not known.

As mentioned above, existing examples in the art of a pixel-by-pixel rendering of a full 3D environment requires application of significant computational resources. As such, these existing methods are not practical for real-time reconstruction of 3D models. In a similar manner to the generation of 3D/4D avatars for objects as described above, the present invention seeks to instead generate a 3D environment model by use of 3D descriptor data for that environment.

In one advantageous embodiment, the 3D environment model may be constructed by receiving image data from plurality of cameras, each camera placed at different known points within the environment, performing image processing techniques to identify stationary objects and/or stationary features of the environment within the image data for each camera, and triangulating stationary features and/or stationary objects detected in image data collected from each camera to identify the location of each stationary object and/or feature. Once the locations of each stationary object and/or feature are determined, a pre-determined 3D model of the environment can be mapped to the determined stationary objects and/or stationary features. And suitable image processing technique can be used to identify stationary objects and/or stationary features of the environment within the image data, including the implementation of convolutional neural networks. Examples of features to be determined include goalposts, corner posts, line markings on the ground, etc. The same techniques for identifying stationary objects can also be applied to additional stationary cameras for which the positions are not known, to identify a plurality of stationary objects in image data collected by those cameras. Since the same stationary objects are identified in the image data of cameras for which the positions are known, a correspondence between the different stationary objects in the different sets of camera data can be made, allowing for an inference of the unknown position locations of the additional stationary cameras.

In one further advantageous refinement, in addition to or as an alternative to the above-described feature extraction to construct the 3D environment model, the 3D environment model may be constructed by applying Simultaneous Localisation and Mapping (SLAM) techniques to the image data to estimate a position and an orientation of each camera of the at least one camera and to construct an environment map, and constructing the 3D model by mapping the environment map to a pre-determined 3D model of the environment. SLAM techniques are understood as computational methods used by an agent to construct and/or update a map of an environment while simultaneously keeping track of that agent's location within the environment in real time.

In the present invention, SLAM methodology can be applied to the image data of the environment 600 collected from at least one non-stationary camera (for example, camera 601*c*) in environment 600 to simultaneously derive the location of each camera within the environment and map the environment containing the camera. When applied to the image data, SLAM methodology will produce a low resolution 3D model of the environment and an estimation of the camera position and pose within that low resolution 3D model. The low resolution 3D model can then be mapped to a high resolution version stored within a database. SLAM methods can be used simultaneously on multiple cameras within the same environment to simultaneously locate those cameras within that same environment.

Forming part of the SLAM methodology can be a process of image detection of the image data, in which stationary objects are detected within the environment. The object detection methodologies used may be similar to those described above for detection of the non-stationary objects in the image data. For example, a convolutional neural network may be implemented, where the convolutional neural network is trained on a dataset including images of the stationary objects to be detected.

The output of the SLAM methodology implemented is an environment map that identifies feature points in the environment 600 while also identifying the location. The map can be topological in nature, describing only feature points of the environment rather than a full geometric recreation. The topological map may be as few as 100 pixel coordinates, with each pixel describing a location of a feature point relative to the camera(s) used to determine the pixels. For example, the SLAM techniques may identify many static features of the environment, such as the goalposts, the corners of the pitch, the seating stands on the sides of the pitch, etc. The environment map is then mapped to a pre-determined 3D model of the environment. For example, each pixel of the environment map can have a corresponding point in the pre-determined 3D model.

Any suitable SLAM methodology can be applied to simultaneously determine the location, position and orientations of the cameras. For example, a hidden Markov model can be applied where the measurement state is the image data, the hidden state is the location of elements of the environment.

Examples of fast SLAM techniques suitable for use in the present invention are discussed in "FastSLAM: A factored solution to the simultaneous localization and mapping problem" by Montemerlo, Michael, et al., Aaai/iaai 593598 (2002), and also in "6-DoF Low Dimensionality SLAM (L-SLAM)", by Zikos, Nikos; Petridis, Vassilios (2014), Journal of Intelligent & Robotic Systems, springer.

After constructing the 3D model of the environment, the method may further comprise integrating the determined 3D environment model with the constructed 3D or 4D skeletons for each of the classified objects to construct a 3D or 4D model of an integrated environment, said integrated environment comprising said environment and said 3D or 4D skeletons of the classified objects within the environment. This integration step can be performed independent of the step of integrating 3D models with the 3D skeletons to create 3D avatars. Thus, the 3D or 4D integrated environment model accurately represents the environment and its associated objects while minimizing data used to describe that environment. This 3D or 4D integrated model can be exported in a data file and stored, for integration with pre-generated 3D models at a later date to fully reproduce that scene at a later date, either at the same computer system that generated the model, or at a separate computer system.

The integrated 3D or 4D environment model can also be used to derive characteristics about the environment. Advantageously, the method may further include, for each classified object of the classified at least one object, using the integrated 3D or 4D environment to derive properties of the classified object. When using a 3D environment, the properties may include, for example, three dimensional location information regarding the position of the classified object (and any point on the 3D skeleton for that classified object) with respect to the environment and with respect to other objects (and any point on the 3D skeletons for said other objects) within the environment. These properties can then be used, for example, for determining whether players on a pitch comply with rules of a sporting game, such as the offside rule in football. In this example, the portions of a 3D skeleton of a player can be analyzed with respect to the environment and other objects in the environment to determine whether any that player's body parts, except the hands and arms, are in the opponents' half of the pitch, and closer to the opponents' goal line than both the ball and the second-last opponent player (the placement of the ball and second-last opponent player with respect to the environment can be derived from the respective 3D skeletons for said ball and second-last opponent player). For example, a two-dimensional vertical plane may be generated in the 3D environment running the width of the pitch and intersecting with the point behind which any body parts of a player would be considered to be offside. Determined locations of the elements of a constructed 3D skeleton of a player are then compared to this 2D plane to determine if they fall behind the plane and thus in an area considered offside. For example, the dimensions of an element of the 3D skeleton (e.g. a leg) may be derived from the 3D skeleton, from which it is determined whether any part of the body part represented by the element of the 3D skeleton falls behind the 2D plane. These elements may be predefined elements including the legs, feet, knees or any other part of a human body that does not include the hands and arms of the human body.

The point beyond which a player might be considered offside might change (and thus, the placement of the 2D plane might change) depending on a different definition of the offside rule (e.g. as the rule changes over time, or when considering other sporting environments such as rugby). However, it is readily understood that the same principles as described above can still be applied—i.e. the point beyond which a player is considered to be offside is determined by considering placement of objects or elements of objects in a sporting environment, and it is determined whether elements of any player fall behind this point. The specifications of the offside rule may be pre-programmed into the system or may be specified by a user at the point where compliance is to be determined.

When using a 4D environment model, the properties may include, for example, time-varying three dimensional location information regarding the time-dependent position of the classified object with respect to the environment, and with respect to other objects within the environment. Thus, the integrated 3D or 4D environment model can be used to derive quantities such as the speed of one or more players, changing team formations and locations on the pitch, speed and movement of individual joints of players, etc. Additionally, the properties derived from the 4D environment model may also comprise determining compliance with the offside rule at different points in time in the manner described above for each time instant. This determination can be made at or after a given point in time, either on the request of a user of the system, or at or after the time at which a particular event is detected. In the case of the offside rule, the integrated 4D environment model can also be used to identify the exact point in time a ball was kicked. It is at or after that point in time that the analysis described above comparing the positions of parts of players' bodies with a 2D plane may be carried out. Subsequent events after the point in time when the ball was kicked may also be determined, including further interactions between a player and another player and/or the ball (e.g. a player touching another player or touching the ball) or relative placement of the classified objects in the sporting environment (e.g. whether a player in an offside position obstructs the line of sight to the ball of an opponent player). For example, the touching of a player by another player or the ball by a player may be determined by relative positioning of 3D skeletons of the respective objects. Thus, the method and system are able to determine, after the ball has been kicked, whether offside offences have occurred.

Alternatively, or in addition, after constructing the 3D model of the environment, the method may further comprise integrating the determined 3D environment model with the constructed 3D avatar for each of the classified objects to construct a 3D model of an integrated environment, said integrated environment comprising said environment and said objects within the environment. As described above, each of the 3D/4D avatars constructed by any previously described method include location information placing each 3D avatar within the environment. Thus, by integrating the 3D/4D avatars with the environment, there is produced an integrated 4D model accurately depicting, in 3D, an environment and all objects in that environment, as well as the time-based progression of non-static elements within that environment.

It will be understood that, in a similar manner as described above for the integrated 3D or 4D environment comprising the 3D or 4D skeletons, the integrated 3D or 4D environment comprising the constructed avatars can also be used to derive characteristics about the environment. Advantageously, the method may further include, for each classified object of the classified at least one object, using the model of the integrated 3D or 4D environment to derive properties of the classified object. When using a 3D model, the properties may include, for example, three dimensional location information regarding the position of the classified object (and any point on the surface 3D avatar for that classified object) with respect to the environment and with respect to other objects (and any point on the surfaces of the 3D avatars for said other objects) within the environment. In accordance with the example as described above, these properties can then be used, for example, for determining whether players on a pitch comply with rules of a sporting game, such as the offside rule in football. In this example, the portions of a 3D avatar of a player can be analyzed with respect to the environment and other objects in the environment to determine whether any of that player's body parts, except the hands and arms, are in the opponents' half of the pitch, and closer to the opponents' goal line than both the ball and the second-last opponent player (the placement of the ball and second-last opponent player with respect to the environment can be derived from the respective 3D avatars or 3D skeletons for said ball and second-last opponent player). For example, a two-dimensional vertical plane may be generated in the 3D environment running the width of the pitch and intersecting with the point behind which any body parts of a player would be considered to be offside. The portions of the 3D avatar (including the surfaces of the 3D avatar) of a player are then compared to this 2D plane to determine if any part of 3D avatar (including the surfaces of the 3D avatar) falls behind the plane and thus in an area considered offside. The portions to be compared may be for predefined portions of the player, including the legs, feet, knees or any other part of a human body that does not include the hands and arms of the human body.

The point beyond which a player might be considered offside might change (and thus, the placement of the 2D plane might change) depending on a different definition of the offside rule (e.g. as the rule changes over time, or when considering other sporting environments such as rugby). However, it is readily understood that the same principles as described above can still be applied—i.e. the point beyond which a player is considered to be offside is determined by considering placement of objects or elements of objects in a sporting environment, and it is determined whether elements of any player fall behind this point. The specifications of the offside rule may be pre-programmed into the system or may be specified by a user at the point where compliance is to be determined.

When using a 4D model comprising constructed 4D avatars, the properties may include, for example, time-varying three dimensional location information regarding the time-dependent position of the classified object with respect to the environment, and with respect to other objects within the environment. Thus, the integrated 3D or 4D environment model can be used to derive quantities such as the speed of one or more players, changing team formations and locations on the pitch, the speed and movement of individual joints of players, etc. Additionally, the properties derived from the 4D environment model may also comprise determining compliance with the offside rule at different points in time in the manner described above for each time instant. This determination can be made at or after a given point in time, either on the request of a user of the system, or at or after the time at which a particular event is detected.

In the case of the offside rule, the integrated 4D environment model can also be used to identify the exact point in time a ball was kicked. It is at or after that point in time that the analysis described above comparing the positions of parts of players' bodies with a 2D plane may be carried out. Subsequent events after the point in time when the ball was kicked may also be determined, including further interactions between a player and another player and/or the ball (e.g. a player touching another player or touching the ball) or relative placement of the classified objects in the sporting environment (e.g. whether a player in an offside position obstructs the line of sight to the ball of an opponent player). For example, the touching of a player by another player or the ball by a player may be determined by relative positioning of 3D skeletons of the respective objects, or may be determined by whether the surfaces of the 3D avatars for the respective objects are in contact. Thus, the method and system are able to determine, after the ball has been kicked, whether offside offences have occurred.

It is understood that separate derivation and construction of constituent components of the integrated environment may result in mismatch errors when combined. For example, a 3D avatar of a human being may be slightly misaligned with respect to the ground of the pitch, resulting in the 3D avatar "floating" above the pitch or "sinking" into the pitch. The methods of the present invention may reduce the error of such mismatches by refining the construction of the integrated environment by constraining interactions between each constructed 3D avatar and the 3D environment model. For example, the integration of a 3D avatar with the 3D environment may be constrained such that no element of the texture of the mapped 3D model may overlap with a texture of the environment (e.g. 'pinning' a standing human's feed to the ground of the environment).

Such methods can again be applied using an appropriately trained neural networks. For example, objects for which 3D avatars are constructed can be observed interacting with an environment using motion capture technology. The training data can comprise the objects performing a wide variety of actions (e.g. running, jumping, walking) to identify a correspondingly wide variety of arrangement of features of said object with respect to an environment. For example, when a human runs, the feet will contact the floor of the environment only at certain points in his/her gait. Training the neural network with such examples enables the method of the present invention to recognise an appropriate interaction between a classified object and the environment to constrain the interactions between the corresponding constructed avatar and the 3D environment model in constructing the integrated environment model.

The generated integrated environment model can be improved further. In particular, it will be understood that the image data collected by the at least one camera might be a comprehensive observation of each object for which an avatar is to be generated. The time-separation between captured instances of an object may be greater than the time separation for which a 4D avatar is to be constructed. As such, attempting to generate an animation from the 3D avatar will demonstrate "jitter" as the animation progresses.

This jitter can be reduced or removed by the method further comprising applying time-dependent smoothing to each constructed 3D avatar or each constructed 3D skeleton from which the avatar is created. The smoothing can be performed using a variety of filtering methods, such as temporal neural networks or temporal estimators, surface fitting, etc. The temporal neural networks can be trained using training data with fine time resolution (e.g. a higher framerate than 60 fps, used in typical video transmission). In addition, or alternatively, the smoothing of individual 4D avatars can be based on the time-dependent holonomic constraints described above. In particular, further points for a 3D skeleton for additional points in time can be calculated by interpolating between two already determined sets of values, at measures points in time, of a 3D skeleton representing the object. Those interpolated values can then be constrained based on the same kinematic models used to determine the already determined values. For example, if a finite number of 3D skeletons of a 4D avatar for a bowstring or a javelin were determined from image data using holonomic constraints based on physical laws relating to elasticity, additional 3D skeletons can be derived from the existing determined 3D skeletons by applying the same equations used for the holonomic restraints in 3D skeleton determination. Thus, additional 3D skeletons for the 4D avatar may then be derived and new surface textures applied to the refined 4D avatar to creature a smoothed 4D avatar. Further, anatomical constraints on the degrees of movement for the human body can constrain the modelling of the motion of a human avatar.

The smoothing can be applied to each 4D descriptor data, or to each 4D avatar, independent of any integration with the environment, or the smoothing can be performed as part of the integration step to refine the construction of the integrated environment, wherein the interaction between the 3D environment and each 4D avatar is modelled as part of the smoothing technique. In particular, the interactions between the 3D environment and 4D avatar may comprise further refinement based on established laws of physics. For example, the trajectory of a ball can be modelled using Newtonian physics and laws of gravitation to constrain the degrees of freedom for the trajectory of the ball. Optionally, further features of the environment not detected as objects in the image data can be generated on the fly based on the interaction between the environment and the 4D avatars—one example is cast shadows on the ground; these can be generated and integrated with the 3D model based on the position of each avatar and suitably programmed parameters (solar radiance level, time of day, etc).

The generated integrated environment model can be improved yet further. In particular, it will be understood that in situations where the environment includes at least two interacting objects for which 4D avatars are to be generated, the combination of two such avatars in a single environment may provide similar mismatch errors as those described above between the 4D avatar and the environment. For example, a 3D avatar of a human being may be slightly misaligned with respect to a tennis racquet that person is holding, resulting in the 3D avatar for the racquet "floating" away from the hand of the human, or "sinking" into the hand of the human. Similarly, when modelling multiple non-human objects, such as snooker balls in a snooker game, the spheres of modelled 4D avatars may overlap in a manner that is not physically possible.

The methods of the present invention may reduce the error of such mismatches. In particular, in an improved method, constructing a 3D avatar for each of the classified objects comprises constructing a plurality of 3D avatars, and the method further comprises refining the construction of the integrated environment by constraining interactions between the plurality of 3D avatars to refine the estimate of the placement of one or more 4D objects with respect to the environment. The constraints may be implemented by the application of neural networks or another suitable statistical and/or probabilistic method, including temporal quadratic estimators. In addition, or as an alternative, heuristically developed rules can be implemented. For example, an operator of the system can specify a set of equations that effectively model specific object-object interactions, and these equations are applied to refine the positioning of the objects with respect to each other and the environment. Additionally, the constraints may include refining the possible interactions between the plurality of 3D avatars based on known equations from physical laws.

The heuristically developed rules or the known equations from physical laws may describe the time-dependent location for multiple objects and be applied simultaneously to multiple objects for which 4D models have been derived. Thus, if the time-dependent evolution for each object is known in the form of a 4D vector for that object, the system may simultaneously place/orient these 4D vectors with respect to each other and the environment by constraining that each 4D vector must simultaneously satisfy the constraint set forward by the heuristic equation, equation from physical law or any other constraint.

For example, a snooker match comprises multiple solid spheres interacting on a flat surface, and the interaction of multiple solid spheres can be predictably modelled at least in part based on collision dynamics of Newtonian objects. Thus, the 4D vectors for each modelled ball on the snooker table is simultaneously oriented/placed with respect to each other and the environment by constraining that each 4D vector must simultaneously satisfy equations describing collision dynamics in space and time.

The integrated 4D model represents an output of the methods of the present invention. As described above, the integrated 4D model that is output may comprise only the 3D environment and the 4D skeletons (to which 3D models may be mapped later), or may comprise the 3D environment and the 4D avatars already mapped to the 4D skeletons. This integrated 4D model may be subsequently manipulated and implemented for a variety of purposes in line with the benefits of the invention. For example, the model can be used to render new 2D images or videos of the integrated environment that were not represented in the image data. For example, the rendered images or videos may represent the environment from a new perspective (e.g. on the pitch of a football game itself, or at any requested point in the stands of the crowd). The generated data may be Virtual Augmented Reality (VAR) data for use with a VAR headset. An operator can also manually refine the determined 4D model for greater precision (e.g. to smooth out jitters or misalignments not already corrected by the above methods). The output data (namely a 4D environment model, and each of its constituent components), may be configured for use by any known engine for use in generating visual outputs (e.g. 2D output, 3D output). For example, the 4D models can suitable for use in the Unity video game engine.

As mentioned above, the output data may contain determined 4D skeletons independent of the environment, or the 4D skeletons can be isolated from the data describing the 4D integrated environment model. Advantageously, the 4D skeletons contained in the output data may also be used to generate a 3D or 4D model of one or more objects for integration with additional image data. In particular, the method may further comprise capturing additional image data that includes additional time-ordered sequence of frames, generating a 4D avatar for an object, and overlaying (or superimposing) a two dimensional representation of that 4D avatar onto the additional image data to augment the additional time-ordered sequence of frames with a depiction of the object. For example, a video feed of a live football game may be augmented with additional players to depict those players. Alternatively, a 4D model may augment a video feed of a studio environment, to display the image of a footballer, and the actions taken by that footballer, alongside a presenter in the studio.

As described above, the intermediate 3D and 4D descriptor information may be used to determine other characteristics and/or properties of the objects detected in the environment. These characteristics and/or properties may also be inferred/determined from the final integrated 4D model. As such, characteristics and/or properties regarding a moveable object's relationship with the environment may be inferred from the model (e.g. the amount of time a player has spent in a certain area of the pitch, relative speed with respect to other players/objects, etc).

The characteristics and/or properties may be determined automatically by pre-programmed equations and in real-time (and at the same time as determination of the 3D data), but also manually by an operator after calculation of the model.

The above described examples are in reference to a method, and it will be understood that any or all of the methods described above can be implemented by a suitably configured computer. In particular, forming part of the present invention is a computer comprising a processor configured to carry out the method of any method described above. In the description above, references have been made to certain steps that may be performed by a human operator to refine the method. However, it would be understood that such human-based inputs are optional, and the method can be conducted in its entirety by a computer system in an automated fashion to automatically produce and output a 4D spatio-temporal model (and results of any automated analysis of that 4D spatio-temporal model) of an environment based on input image data. For example, a user of the system could upload image data (in the form of video feeds), identify the context of the image data (e.g. type of sport), and then instruct the computer to analyse the data. The computer, in an automated fashion, will generate output data in the manner described, said output data being suitable for export to a suitable engine for rendering of a visualisable model of the environment.

An exemplary system 700 for carrying out the present invention is illustrated in FIG. 7. The system 700 comprises a computer 702. The computer 702 comprises a processor 704 that is configured to perform the method according to any method described above, including the step of receiving image data 708. Image data 708 is received from one or more of a number of vision systems 710. Each vision system is configured in any suitable manner to transmit data from the cameras to the computer 702, which can include a wired camera 710*a* communicating with the computer over a wired connection 712*a* and a remote camera 710*b* configured for communication with the computer 702 over a network 712*b*. The network may be a kind of network suitable for communication of data (e.g. WLAN, LAN, 3G, 4G, 5C etc). The computer comprises storage 714 in which any suitable data may be stored (for example, the image data 708 received from the vision systems 710, or the above described predetermined 3D models).

Also forming part of the present invention is a computer program comprising instructions that, when executed by a processor (such as processor 704), cause the processor to carry out any method described above. The computer program may be maintained on a separate computer storage medium, or the computer program may be stored in the storage 714. The computer program includes the necessary instructions and coding to implement every step of the method, including the statistical and/or probabilistic methods and implementation of neural networks, as described above. The computer program may make reference to other programs and/or data maintained or stored remotely from the computer 702.

Figures 7A, 7B:
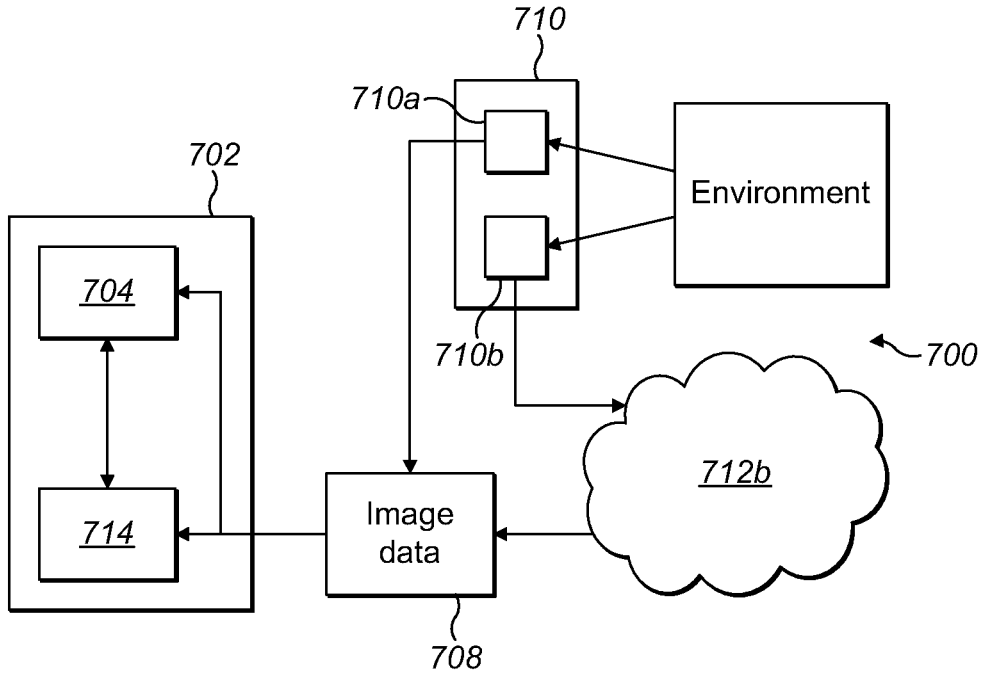
FIG. 7A is an exemplary system architecture suitable for performing the invention.
FIG. 7B is an exemplary processor architecture suitable for performing the invention.

The processor 704 configured to carry out the present invention can be understood as a series of suitably configured modules, as illustrated in FIG. 7B. For example, the processor can comprise a detection module 720, which performs all above described object detection steps; a classification module 722 which performs all above described object classification steps; a 2D skeleton determination module 724, which performs all above described 2D skeleton determination steps; a 3D skeleton construction module 726, which performs all above described 3D skeleton construction steps; a tracking module 728, which performs all above described tracking steps; a 3D environment construction module 730, which performs all above described 3D environment construction steps; an integration module 732, which performs all above described integration steps. The described modules are not intended to be limiting, and it is understood that many suitable configurations of processor are possible to enable the processor to perform the above described methods.

Although preferred embodiments of the invention have been described, it is to be understood that these are by way of example only and that various modifications may be contemplated.

Various examples are described below in the following numbered paragraphs (NPs):

NP1. A method for deriving a 3D data from image data of a sporting environment for use in determining compliance with an offside rule in a sporting match, said method comprising:

receiving, from at least one camera, image data representing the environment;

detecting, from the image data, at least one object within the environment;

classifying the at least one detected object, wherein the method comprises, for each classified object of the classified at least one objects:

determining a 2D skeleton of the classified object by implementing a neural network to identify features of the classified object in the image data corresponding to the classified object; and constructing a 3D skeleton for the classified object, comprising mapping the determined 2D skeleton to 3D.

NP2. The method of NP1, wherein each of said at least one object comprises a plurality of associated sub-objects, and wherein, for each of said at least one object:

detecting at least one object comprises detecting each of the plurality of associated sub-objects;

classifying at least one object comprises classifying each of the plurality of associated sub-objects;

determining the 2D skeleton of the classified object comprises identifying features of each of the plurality of classified sub-objects in the image data corresponding to the classified sub-objects.

NP3. The method of NP1 or NP2, wherein, for each classified object, mapping the determined 2D skeleton to 3D comprises:

implementation of a neural network; and/or applying statistical and/or probabilistic methods to the determined 2D skeleton and applying holonomic constraints to the statistical and/or probabilistic methods.

NP4. The method of NP3, wherein classifying the at least one detected object comprises classifying a first detected object of the at least one detected object as a human object, and, when statistical and/or probabilistic methods are applied to the determined 2D skeleton, the holonomic constraints comprise human anatomical holonomic constraints.

NP5. The method of any preceding NP, wherein classifying the at least one detected object comprises classifying a second detected object of the at least one detected object as a non-human object.

NP6. The method of any preceding NP, wherein the at least one camera comprises a plurality of cameras;

wherein detecting at least one object comprises detecting said at least one object in image data collected from each camera;

classifying the at least one object comprises classifying said at least one object detected in the image data from each camera;

determining the 2D skeleton for each classified object comprises determining a plurality of 2D skeletons, each of said plurality of 2D skeletons determined from identifying features of the classified object in image data collected from a different camera of the plurality of cameras; and wherein constructing the 3D skeleton comprises combining the determined plurality of determined 2D skeletons.

NP7. The method of any preceding NP, further comprising:

constructing, from the image data, a 3D model of the environment;

constructing a 3D integrated environment comprising, for each of the classified at least one objects, integrating the 3D skeleton for the classified object with the 3D environment model; and determining characteristics of the integrated 3D environment, comprising deriving, for each classified object, placement information of the 3D skeleton for the classified at least one objects in respect of the 3D environment to determine if a player in the 3D environment complies with the offside rule.

NP8. The method of any one of NPs 1-6, further comprising:

constructing, from the image data, a 3D model of the environment;

for each classified object of the classified at least one objects: constructing a 3D avatar for the classified object comprising integrating the constructed 3D skeleton with a 3D model corresponding to the classified object;

integrating the 3D environment model with the constructed 3D avatar for each of the classified at least one objects to construct a 3D model of an integrated environment, said integrated environment comprising said environment and said objects within the environment; and determining characteristics of the 3D model of the integrated environment, comprising deriving, for each classified object, placement information of the 3D avatar for the classified object in respect of the 3D environment to determine if a player in the 3D environment complies with the offside rule.

NP9. The method of NPs 1-6, wherein:

the image data collected from each camera of the at least one cameras comprises a time-ordered sequence of frames, and said detecting at least one object within the environment comprises detecting said at least one object in each frame of the time-ordered sequence of frames, said classifying the at least one detected objects comprises classifying the at least one detected object in each frame of the sequence of frames; and each classified object of the classified at least one objects is tracked across the time-ordered sequence of frames.

NP10. The method of NP9, wherein each classified object is tracked across the time-ordered sequence of frames by implementing a recursive estimator; and, for each classified object, mapping the determined 2D skeleton to 3D comprises:

determining a plurality of 3D skeletons to form a time-varying 3D skeleton, and applying a recursive estimator across the time-ordered sequence of frames to determine a time-varying 3D skeleton for the classified object.

NP11. The method of NP10, wherein the application of recursive estimators comprises applying time-dependent holonomic constraints.

NP12. The method of any one of NPs 9-11, further comprising constructing, from the image data, a 3D model of the environment.

NP13. The method of NP12, wherein the 3D environment model is constructed by applying Simultaneous Localisation and Mapping techniques to the image data to estimate a position and an orientation of each camera of the at least one camera and to construct an environment map; and constructing the 3D model by mapping the environment map to a pre-determined 3D model of the environment.

NP14. The method of NP12 or NP13 further comprising integrating the time-varying 3D skeleton with the 3D environment model to construct a time-varying integrated environment; and determining characteristics of the integrated time-varying 3D environment, comprising deriving, for each classified object, time-varying placement information of the 3D skeleton for the classified object in respect of the 3D environment to determine if a player in the 3D environment complies with the offside rule.

NP15. The method of any preceding NP, the method further comprising, for each classified object of the classified at least one objects:

constructing a 3D avatar for the classified object comprising integrating the constructed 3D skeleton with a 3D model corresponding to the classified object.

NP16. The method of NP15, wherein the method further comprises capturing the 3D model corresponding to the classified object at a higher resolution than the resolution of the image data.

NP17. The method of NP12 or NP13, further comprising:

for each classified object of the classified at least one objects: constructing a 3D avatar for the classified object comprising integrating the constructed 3D skeleton with a 3D model corresponding to the classified object, and integrating the determined 3D environment model with the constructed 3D avatar for each of the classified objects to construct a 3D model of an integrated environment, said integrated environment comprising said environment and said objects within the environment;

determining characteristics of the 3D environment model, comprising deriving, for each classified object, placement information of the 3D avatar for the classified object in respect of the 3D environment to determine if a player in the 3D environment complies with the offside rule.

NP18. The method of any one of NP7, NP8, NP14 or NP17, where determining if a player in the 3D environment complies with the offside rule comprises, in response to a user-detected or automatically-detected event, the steps of:

generating a 2D vertical plane, said 2D plane intersecting with the point behind which any body parts of the player would be considered to be offside; and determining on which side of the two-dimensional plane predefined portions of the player may be found.

NP19. The method of NP17, further comprising refining the construction of the integrated environment by applying time-dependent smoothing to the constructed 3D avatar, using filtering methods.

NP20. The method of NP17 or NP19, further comprising refining the construction of the integrated environment by constraining interactions between each constructed 3D avatar and the 3D environment model.

NP21. The method of any one of NP17-NP20, wherein constructing a 3D avatar for each of the classified objects comprises constructing a plurality of 3D avatars, and the method further comprises refining the construction of the integrated environment by constraining interactions between the plurality of 3D avatars.

NP22. A computer comprising a processor configured to carry out the method of any preceding NP.

NP23. A computer program comprising instructions that, when executed by a processor, cause the processor to carry out the method of any of NP1-NP21.

The invention claimed is:

1. A method for deriving a 3D data from image data, comprising:

receiving, from at least one camera, image data comprising a time-ordered sequence of frames, the time-ordered sequence of frames comprising frames collected from each camera of the at least one cameras, the image data representing an environment;

detecting, from the image data, at least one object within the environment comprising detecting said at least one object in each frame of the time-ordered sequence of frames;

classifying the at least one detected object comprising classifying the at least one detected object in each frame of the sequence of frames, wherein the method comprises, for each classified object of the classified at least one objects:

determining a 2D skeleton of the classified object by implementing a neural network to identify features of the classified object in the image data corresponding to the classified object; and constructing a 3D skeleton for the classified object, comprising a step of mapping the determined 2D skeleton to 3D, wherein that step comprises:

determining a plurality of 3D skeletons to form a time-varying 3D skeleton, and applying a recursive estimator across the time-ordered sequence of frames to determine a time-varying 3D skeleton for the classified object, wherein a derived 3D skeleton at a first time instance is used as a further input to the derivation of a second 3D skeleton at a second time instance.

2. The method of claim 1, wherein each of said at least one object comprises a plurality of associated sub-objects, and wherein, for each of said at least one object:

detecting at least one object comprises detecting each of the plurality of associated sub-objects;

classifying at least one object comprises classifying each of the plurality of associated sub-objects;

determining the 2D skeleton of the classified object comprises identifying features of each of the plurality of classified sub-objects in the image data corresponding to the classified sub-objects.

3. The method of claim 1, wherein, for each classified object, mapping the determined 2D skeleton to 3D comprises:

implementation of a neural network; and/or applying statistical and/or probabilistic methods to the determined 2D skeleton and applying holonomic constraints to the statistical and/or probabilistic methods.

4. The method of claim 3, wherein classifying the at least one detected object comprises classifying a first detected object of the at least one detected object as a human object, and, when statistical and/or probabilistic methods are applied to the determined 2D skeleton, the holonomic constraints comprise human anatomical holonomic constraints.

5. The method of claim 3, wherein the 3D skeleton comprises an anchor point and a plurality of child points, each child point is defined by applying a transformation to the anchor point or another child point of the plurality of child points, wherein the holonomic constraints define the degrees of freedom of the transformation defining each child point, and/or the range of possible values for each degree of freedom of the transformation.

6. The method of claim 1, wherein classifying the at least one detected object comprises classifying a second detected object of the at least one detected object as a non-human object.

7. The method claim 1, wherein the at least one camera comprises a plurality of cameras;

wherein detecting at least one object comprises detecting said at least one object in image data collected from each camera;

classifying the at least one object comprises classifying said at least one object detected in the image data from each camera;

determining the 2D skeleton for each classified object comprises determining a plurality of 2D skeletons, each of said plurality of 2D skeletons determined from identifying features of the classified object in image data collected from a different camera of the plurality of cameras; and wherein constructing the 3D skeleton comprises combining the determined plurality of determined 2D skeletons.

8. The method of claim 1, wherein the application of recursive estimators comprises applying time-dependent holonomic constraints.

9. The method of claim 8, wherein:

the 3D skeleton comprises an anchor point and a plurality of child points, each child point is defined by applying a transformation to the anchor point or another child point of the plurality of child points;

the time-varying 3D skeleton is defined by time-variable transformations for each child point, and the time-dependent holonomic constraints define, for each point in time, the degrees of freedom of transformation defining each child point and/or the range of possible values for each degree of freedom of the transformation.

10. The method of claim 1, wherein the at least one camera comprises at least one first type of camera and at least one second type of camera, wherein each of the first type of camera captures image data at a first framerate, and each second type of camera captures image data at a second framerate that is different to the first framerate.

11. The method of claim 1, further comprising constructing, from the image data, a 3D model of the environment.

12. The method of claim 11, wherein the 3D environment model is constructed by applying Simultaneous Localisation and Mapping techniques to the image data to estimate a position and an orientation of each camera of the at least one camera and to construct an environment map; and constructing the 3D model by mapping the environment map to a pre-determined 3D model of the environment.

13. The method of claim 11 further comprising integrating the time-varying 3D skeleton with the 3D environment model to construct a time-varying integrated environment.

14. The method of claim 11, further comprising:

for each classified object of the classified at least one objects: constructing a 3D avatar for the classified object comprising integrating the constructed 3D skeleton with a 3D model corresponding to the classified object, and integrating the determined 3D environment model with the constructed 3D avatar for each of the classified objects to construct a 3D model of an integrated environment, said integrated environment comprising said environment and said objects within the environment.

15. The method of claim 14, further comprising refining the construction of the integrated environment by applying time-dependent smoothing to the constructed 3D avatar, using filtering methods.

16. The method of claim 14, further comprising refining the construction of the integrated environment by constraining interactions between each constructed 3D avatar and the 3D environment model.

17. The method of claims 14, wherein constructing a 3D avatar for each of the classified objects comprises constructing a plurality of 3D avatars, and the method further comprises refining the construction of the integrated environment by constraining interactions between the plurality of 3D avatars.

18. The method of claim 1, the method further comprising, for each classified object of the classified at least one objects:

constructing a 3D avatar for the classified object comprising integrating the constructed 3D skeleton with a 3D model corresponding to the classified object.

19. The method of claim 18, wherein the method further comprises capturing the 3D model corresponding to the classified object at a higher resolution than the resolution of the image data.

20. The method of claim 1, wherein the image data comprising a time-ordered sequence of frames is received from only a single camera.

21. The method of claim 1, wherein, for each classified object, mapping the determined 2D skeleton to 3D is based on holonomic constraints using a hidden Markov model.

22. The method of claim 21, wherein the hidden Markov model uses data from a single frame.

23. The method of claim 22, wherein in the hidden Markov model, a measurement vector $Y_t$ of the classified object is obtained from the single frame, from which a vector $X_t$ of joints of the human skeleton in 3D space is determined.

24. A computer comprising a processor configured to carry out the method of claim 1.

25. A non-transitory computer readable medium comprising executable instructions configured to cause a processor to carry out the method of claim 1.

\* \* \* \* \*